(12) United States Patent
Petsev et al.

(10) Patent No.: US 8,334,014 B1
(45) Date of Patent: *Dec. 18, 2012

(54) MICROPARTICLES WITH HIERARCHICAL POROSITY

(75) Inventors: Dimiter N Petsev, Albuquerque, NM (US); Plamen Atanassov, Albuquerque, NM (US); Svitlana Pylypenko, Albuquerque, NM (US); Nick Carroll, Albuquerque, NM (US); Tim Olson, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 643 days.

This patent is subject to a terminal disclaimer.

(21) Appl. No.: 12/484,885

(22) Filed: Jun. 15, 2009

Related U.S. Application Data

(63) Continuation-in-part of application No. 12/263,947, filed on Nov. 3, 2008.

(60) Provisional application No. 61/061,589, filed on Jun. 13, 2008, provisional application No. 60/985,050, filed on Nov. 2, 2007.

(51) Int. Cl.
*B32B 5/16* (2006.01)

(52) U.S. Cl. ..... 427/212; 427/214; 427/215; 427/213.3; 427/213.31; 428/402; 428/403

(58) Field of Classification Search ........... 428/402, 428/403; 427/212, 214, 215, 213.3, 213.31
See application file for complete search history.

(56) References Cited

U.S. PATENT DOCUMENTS

| | | | | |
|---|---|---|---|---|
| 6,872,675 B2 * | 3/2005 | Imhof et al. | | 501/12 |
| 7,449,237 B2 * | 11/2008 | Chan et al. | | 428/403 |
| 7,862,892 B2 * | 1/2011 | Chan et al. | | 428/403 |
| 8,105,471 B1 * | 1/2012 | Han et al. | | 204/451 |

OTHER PUBLICATIONS

N. Andersson et al. "Combine Emulsion . . . ", Langmuir 2007, 23, 1459-1464.*

* cited by examiner

*Primary Examiner* — Leszek Killiman
(74) *Attorney, Agent, or Firm* — Gonzales Patent Services; Ellen M. Gonzales

(57) ABSTRACT

The present disclosure provides oxide microparticles with engineered hierarchical porosity and methods of manufacturing the same. Also described are structures that are formed by templating, impregnating, and/or precipitating the oxide microparticles and method for forming the same. Suitable applications include catalysts, electrocatalysts, electrocatalysts support materials, capacitors, drug delivery systems, sensors and chromatography.

11 Claims, 18 Drawing Sheets

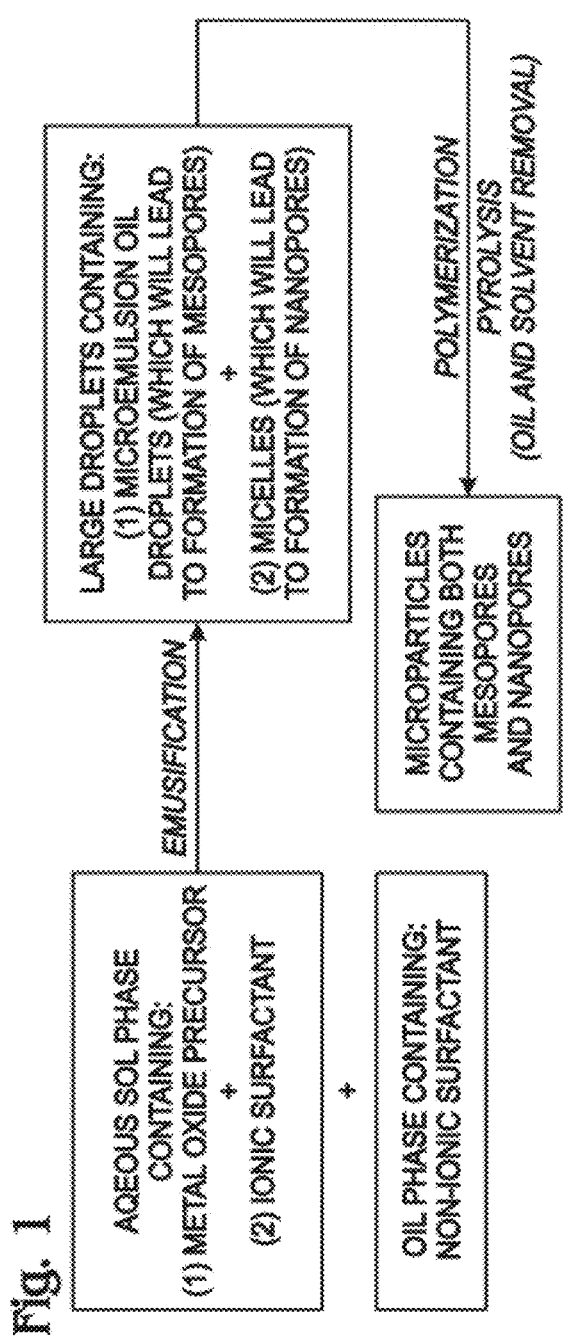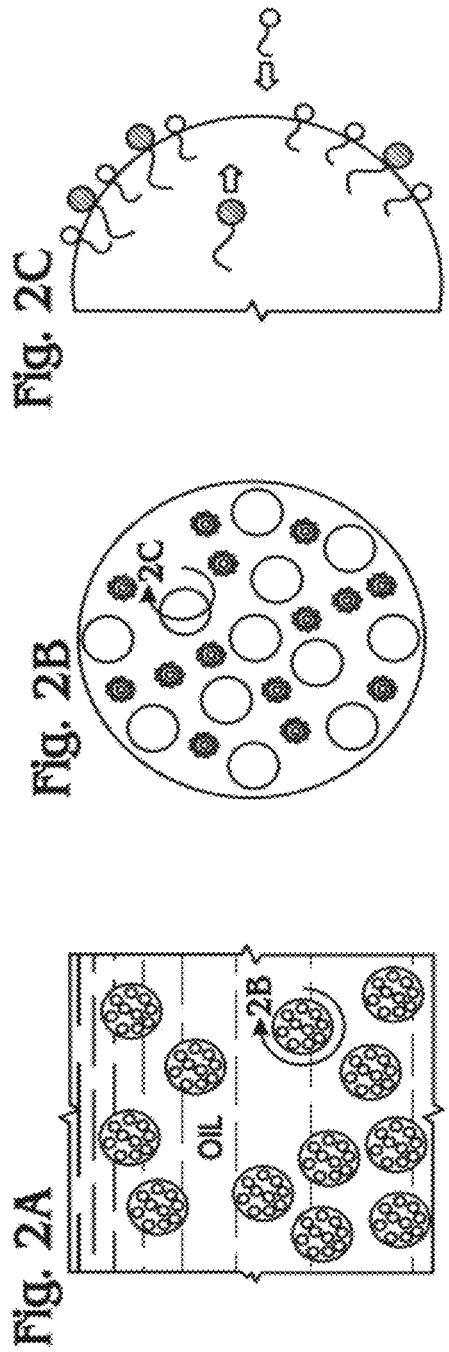

| SURFACTANT | BET (m²/g) | PORE SIZE (nm) |
|---|---|---|
| $CH_3(CH_2)_{17}N(Br)(CH_3)_3$ | 873 | 6.0 |
| STANDARD, $CH_3(CH_2)_{15}N(Br)(CH_3)_3$ | 1000 | 4.9 |
| $CH_3(CH_2)_{13}N(Br)(CH_3)_3$ | 1136 | 4.0 |
| $CH_3(CH_2)_{11}N(Br)(CH_3)_3$ | 1198 | 3.4 |
| $CH_3(CH_2)_9N(Br)(CH_3)_3$ | ↓ INCREASE | ↓ DECREASE |
| $CH_3(CH_2)_7N(Br)(CH_3)_3$ | | |
| $CH_3(CH_2)_5N(Br)(CH_3)_3$ | | |

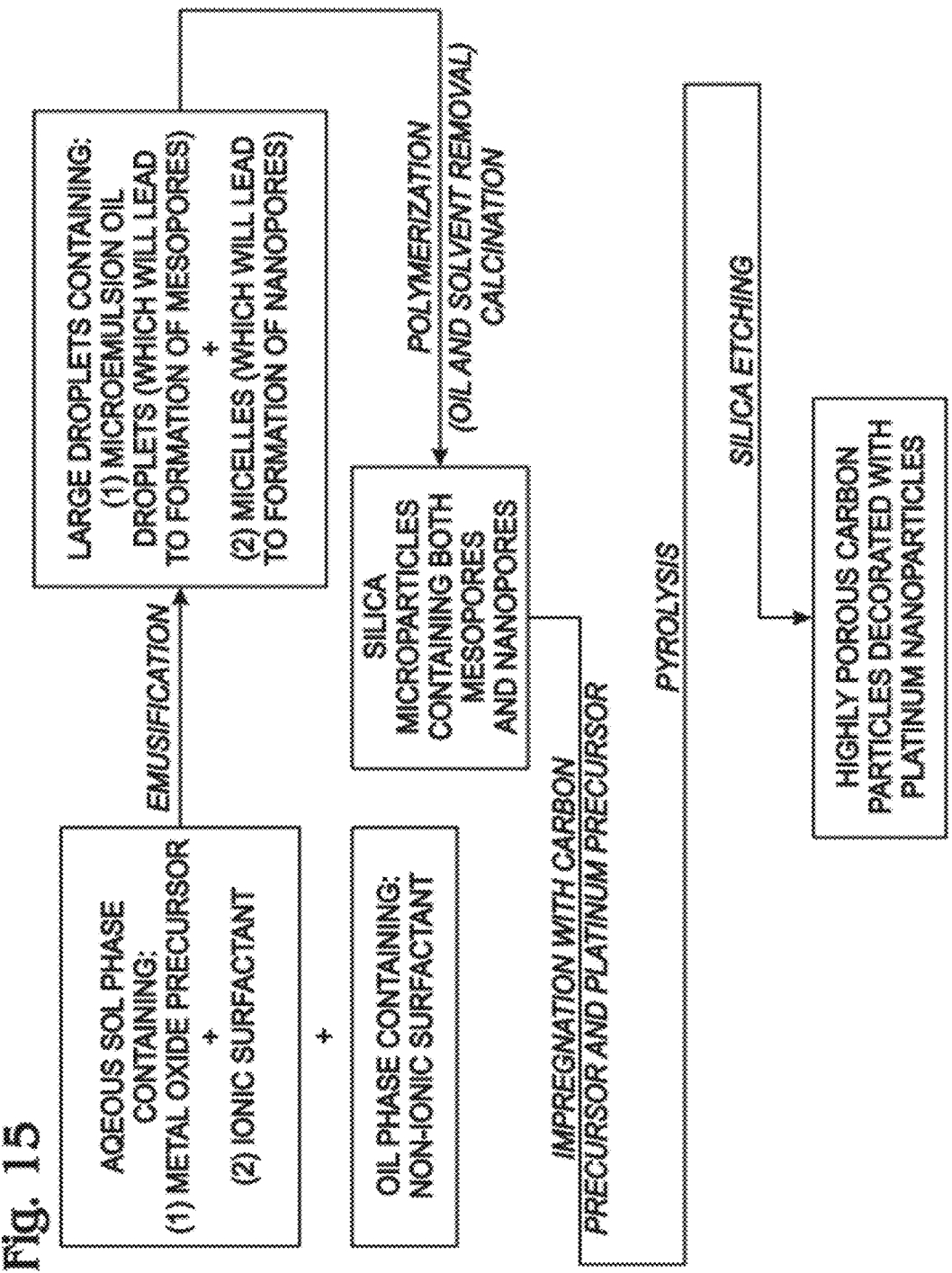

Fig. 19
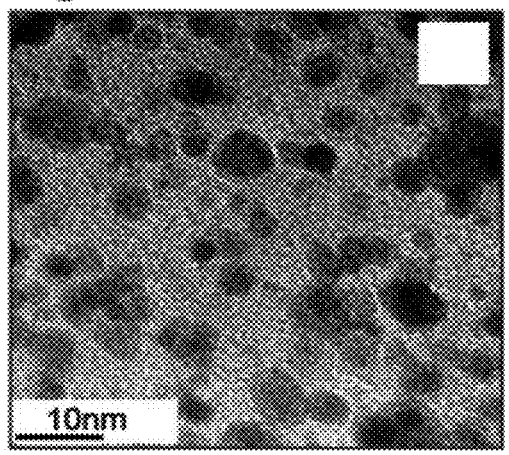
Fig. 22
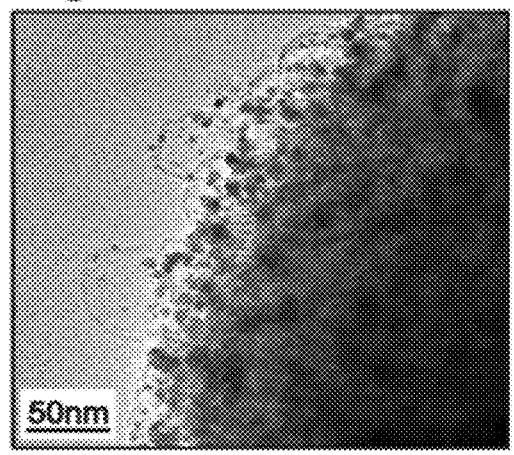
Fig. 20
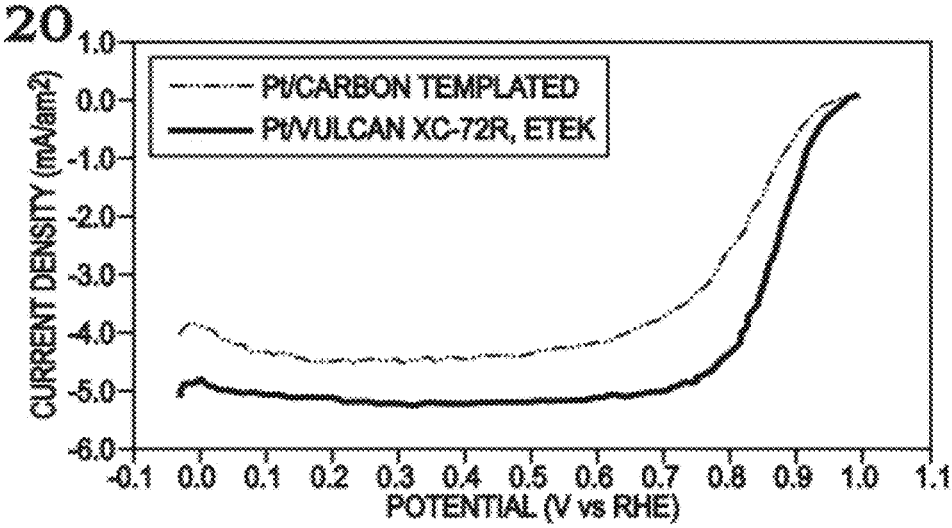
Fig. 21
| Pt/C (wt%) | IMPREGNATION PROCEDURE | OXYGEN (%) | CARBON (%) | PLATINUM (%) |
|---|---|---|---|---|
| 30 | C+Pt TOGETHER | 7.2 | 92.2 | 0.6 |
| 30 | 0.7C, 0.3C+Pt | 8.3 | 90.6 | 1.1 |
| 30 | C, Pt | 11.2 | 87.1 | 1.7 |
| 20 | C, Pt | 11.1 | 87.9 | 1.0 |
| 10 | C, Pt | 10.2 | 89.4 | 0.4 |

MICROPARTICLES WITH HIERARCHICAL POROSITY

CROSS-REFERENCE TO RELATED APPLICATIONS

The following application is a continuation-in-part of U.S. patent application Ser. No. 12/263,947, filed Nov. 3, 2008, which claims the benefit of U.S. Provisional Patent Application No. 60/985,050, filed Nov. 2, 2007, both of which are hereby incorporated by reference in their entirety. The following application also claims benefit of U.S. Provisional Application No. 61/061,589, filed Jun. 13, 2008, which is hereby incorporated by reference in its entirety.

STATEMENT REGARDING GOVERNMENT SPONSORED RESEARCH

This invention was made with Government support under Grant Nos. NSF/PREM (DMR 061161) and NSF/IGERT (DGE 0549500) awarded by National Science Foundation and DOE/NNSA-LANL Prime Contract DE-AC52-06NA25396, LANL subcontract No. 53184-001-07, awarded by the Department of Energy and Los Alamos National Labs. The U.S. Government has certain rights in this invention.

BACKGROUND

Oxide microparticles with predefined properties and structure have enormous potential for a variety of applications. Oxides can be templated to form bulk mesoporous structures using surfactant molecular structures (micelles). The common method for inducing surfactant phase transition and ordering in oxide precursor solution is evaporative-induced self assembly. See, e.g., Hartmann M. *Chem. Mater.* 2005, 18, 4577-4593; Gasteiger H. A.; Kocha S. S.; Sompalli B.; Wagner F. T. *Applied Catalysis B-Environmental* 2005, 56, 9-35; Gallis K. W.; Araujo J. T.; Duff K. J.; Moore J. G.; Landry, C. C. *Advanced Materials* 1999, 11, 1452-1455; and Vallet-Regi M.; Ramila A.; del Real R. P.; Perez-Pariente, J. *Chemistry of Materials* 2001, 13, 308-311, each of which is hereby incorporated by reference. However, previously known techniques for fabricating oxide microparticles do not provide access to the internal pore network and are unsuitable for creating carbon replicas of template particles. Accordingly, microparticles manufactured using known techniques may be unsuitable, or unsatisfactory, for certain applications.

BRIEF DESCRIPTION OF THE DRAWINGS

FIG. 1 is a flowchart showing a method of forming bimodal microparticles according to an embodiment of the present disclosure.

FIG. 2 (a-c) is a sketch of a liquid silica precursor emulsion system according to an embodiment of the present disclosure.

FIG. 2a shows aqueous silica precursor emulsion drops in hexadecane oil. Microemulsion droplets form and occupy the internal drop volume.

FIG. 2b shows a single silica precursor drop. The CTAB is above the CMC forming micelles in addition to microemulsion droplets.

FIG. 2c shows the oil/water interface with adsorbing surfactants from the two immiscible phases.

FIG. 15 is a flowchart showing a method of forming platinum decorated carbon particles according to an embodiment of the present disclosure.

FIG. 19 is a TEM image of a templated carbon particle decorated with platinum nanoparticles at a higher magnification demonstrating the platinum nanoparticles.

FIG. 20 is a graph showing the BET for templated carbon particles decorated with platinum nanoparticles.

FIG. 21 is a graph showing the relationship between the final particle's surface platinum percentage and impregnation timing or platinum loading.

FIG. 22 is a TEM image of a templated carbon particle decorated with platinum, 30 wt. %.

DETAILED DESCRIPTION

Figure 3:
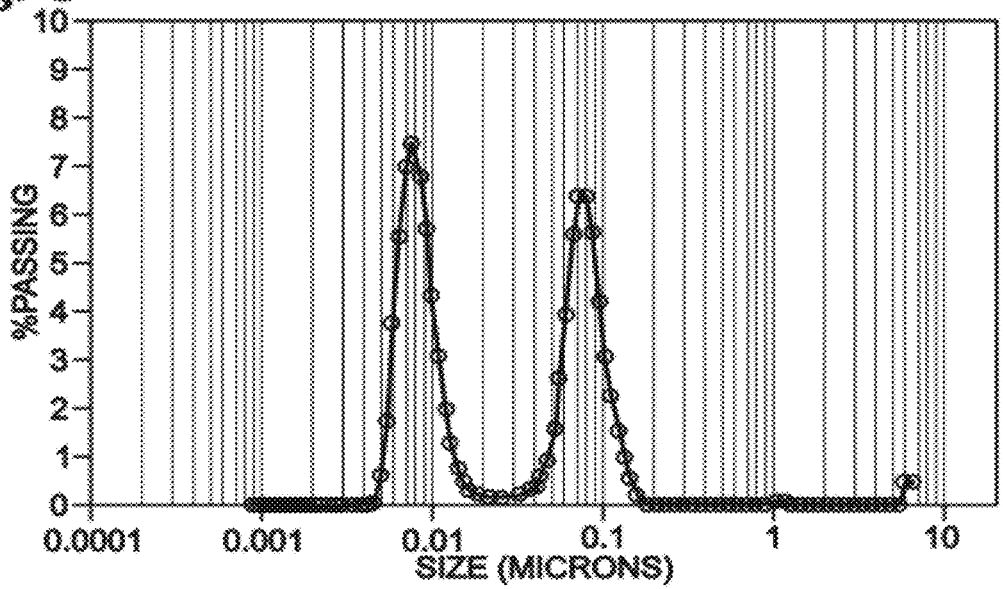
FIG. 3 is a graph showing DLS measurements of the aqueous phase indicating the presence of micelles (~6 nm) and microemulsion droplets (~40 nm).

According to an embodiment, the present disclosure provides mesoporous microparticles with bimodal nanoporosity and methods of manufacturing the same. According to a still further embodiment, the present disclosure provides structures that are formed by exploiting the unique properties of the mesoporous microparticles described herein.

Particles with well-defined pore morphology are essential for many areas of modern technology. Potential applications include and are not limited to, catalysis, electro-catalysis, catalystic support material, chromatography, sensors, capacitors, and drug delivery. See, e.g. Cejka, J.; Mintova S. *Catalysis Rev.-Sci. Eng.* 2007, 49, 457-509; Hartmann M. *Chem. Mater.* 2005, 18, 4577-4593; Gasteiger H. A.; Kocha S. S.; Sompalli B.; Wagner F. T. *Applied Catalysis B-Environmental* 2005, 56, 9-35; Gallis K. W.; Araujo J. T.; Duff K. J.; Moore J. G.; Landry, C. C. *Advanced Materials* 1999, 11, 1452-1455; Vallet-Regi M.; Ramila A.; del Real R. P.; Perez-Pariente, J. *Chemistry of Materials* 2001, 13, 308-311, each of which is hereby incorporated by reference.

Precise control over pore-size and shape is crucial for the successful performance of porous particles. For example, pore size allows for optimization of fluid transport in a catalyst, determines the molecular release of solute by a drug delivering vehicle, or defines the size selectivity in chromatography. Templating of oxide materials with surfactant micelles is a powerful method to obtain mesoporous oxide structures with controlled morphology. See, e.g., Kresge C. T.; Leonowicz, M. E.; Roth W. J.; Vartuli J. C.; Beck J. S. *Nature* 1992, 359, 710-712, which is hereby incorporated by reference. In this method, an oxide precursor solution is mixed with a templating surfactant and evaporation of the solvent leads to an increase in the surfactant concentration. The surfactant forms supra-molecular structures according to the solution phase diagram. This is known as evaporative induced self-assembly (EISA) and has been used to obtain bulk porous materials or microparticles using high-temperature aerosol methods. See, e.g., Lu, Y; Fan, H.; Stump A.; Ward, T. L.; Rieker, T.; Brinker C. J. *Nature* 1999 398, 223-226 and Brinker, C. J.; Lu, Y.; Sellinger, A.; Fan, H. *Adv. Mater.* 1999, 11, 579-585, both of which are hereby incorporated by reference. Alternatively, mesoporous particle synthesis via EISA can be performed in water in oil emulsion droplets under milder temperature stresses. See e.g., Andersson, N.; Kronberg, B.; Corkery, R.; Alberius, P. *Langmuir* 2007, 23, 1459-1464, which is hereby incorporated by reference. U.S. patent application Ser. No. 12/263,947 provides a modified emulsion-based approach to obtain monodisperse droplets using microfluidics. See also, Carroll, N. J.; Rathod, S. B.; Derbins, E.; Mendez, S.; Weitz, D. A.; Petsev, D. N. *Langmuir* 2008, 24, 658-661, incorporated herein by reference. An embodiment of the methods described in the '947 application demonstrated uniform silica microspheres with pores about 6 nm in diameter. Microfluidics was also used by Lee et al. (Lee, I.; Yoo, Y.; Cheng, Z.; Jeong H. K. *Advanced Functional Materials* 2008, 18, 4014-4021, incorporated by reference) to fabricate monodisperse particles with very interesting surface morphology.

To address the technological requirements of emerging technologies, the next generations of porous oxide materials have to be highly structured and functionalized. Accordingly, in an embodiment, the present disclosure provides hierarchically porous structures which can be further modified using templating techniques. Hierarchically porous structures comprising two or more distinct types of size-differentiated pores offer advantages in the design of materials where catalytic activity (which may benefit from smaller pore sizes) is to be utilized in immediate conjunction with transport of reactants (which may benefit from larger pore sizes). Furthermore, templating approaches for hierarchical materials fabrication are attractive as they can be combined with other methods such as impregnation or precipitation to yield structures with controlled porosity, surface chemistry and hydrophilicity or hydrophobicity.

According to an embodiment, the mesoporous microparticles of the present disclosure have a bimodal internal structure, incorporating pores in precise dimensions in both a larger range, which may be, for example, more conducive to reactant transport, and pores in a smaller range, which may be, for example, more conducive to reaction kinetics. According to an embodiment, the microparticles include larger pores ("mesopores") that are in the 10's of nanometers range and smaller pores ("nanopores") that are in the nanometers range. For the purposes of the present disclosure, the term "mesopore" is used to describe pores having a diameter of greater than 10 nanometers and less than 100 nanometers, while the term "nanopore" is used to describe pores having a diameter of less than 10 nanometers. The two types of pores are due to the formation of aqueous drops a few micrometers in diameter that contain both oil microemulsion droplets (which eventually lead to mesopore formation) and smaller ionic micelles (which eventually lead to nanopore formation). The oil microemulsion droplets and ionic micells are engineered by precisely tuning the phase state of the oil/water/surfactant mixture to ensure the presence of the different species. The aqueous drops are then subjected to solvent removal and polymerization, which fossilizes the microemulsion and micellar structures, producing a bimodal porous network within the microparticles.

Turning to FIG. 1, an exemplary method for forming bimodal microparticles according to the present disclosure is shown. In this example, a metal oxide precursor and an ionic surfactant are mixed together to form an aqueous sol phase, while an oil phase containing a non-ionic surfactant is also formed. The aquous sol and oil phases are then added together and emulsified. The emulsion is then heated under reduced pressure and the resulting droplets are subjected to oil and solvent removal and polymerization, for example via calcination or pyrolysis.

According to some embodiments, silica particles having a bimodal internal pore structure (sometime referred to herein as "bimodal" or "biporous" particles) are formed by using a silica precursor. Of course it will be appreciated that any suitable oxide precursor solution can be used including, but not limited to metal oxide precursors such as $SnO_2$, $TiO_2$, $RuO_2$, $NbO_2$ and $Nb_2O_5$.

It will be appreciated that a variety of surfactants are available and may be used in order to form biporous particles having the specific structure and material component(s) desired. However, there are two necessary conditions that must be met for obtaining bimodal porous structures through the microemulsion templating procedure described herein. First, the two surfactants should significantly decrease the interfacial tension when adsorbed, leading to a spontaneous formation of microemulsion droplets. (See, e.g. Holyst, R.; Clach, A.; Gozdz, W. T. in Computational Methods in Surface and Colloid Science; Borowko, M., Ed.; Marcel Dekker: New York, 2000; Vol. 2, p 685. See also, Hu, Y.; Prausnitz, J. M. AIChE J. 1988 34, 814-824. Both references are hereby incorporated by reference.) These droplets are templated to form the larger mesopores. Second, the ionic surfactant should be soluble only in the aqueous phase while the non-ionic surfactant should be soluble only in the oil phase. The excess ionic surfactant that remains in the bulk forms the micelles that are trapped in the solidifying silica, creating the smaller nanopores.

According to one example, a silica precursor solution was prepared by dissolving 1.82 grams of cetyl trimethylammonium bromide (CTAB) in 20 g of DI water under vigorous stirring at 40° C. until the solution was clear. Next, 5.2 g of tetraethylorthosilicate (TEOS, Purum >98%) and 0.57 g of 1 N hydrochloric acid was added to the mixture under vigorous stifling at room temperature for 30 min to hydrolyze and dissolve the TEOS monomer. The measured acidity of the hydrolyzed sol showed pH≈2. The oil phase was prepared by dissolving a modified polyether-polysiloxane/dimethicone copolyol surfactant with the trade name ABIL EM 90 (Degussa) in hexadecane (3 wt %). The aqueous siliceous precursor solution was then added to the oil phase and subsequently emulsified by brisk shaking of the vial. The emulsion was transferred to a 1000 mL round bottom flask and heated to 80° C. under a reduced pressure of 70 mTorr for 3 h. The particles were collected and centrifuged, and the supernatant oil removed, followed by calcination in air at 500° C. for 5 h to remove the templating surfactant.

In this example, the non-ionic surfactant (Abil EM 90) is soluble only in the oil phase while the cationic CTAB is dissolved only in the aqueous phase. Viewing FIG. 2, it can be seen that stifling the entire system leads to the formation of micrometer sized aqueous emulsion drops (containing TEOS) dispersed in a hexadecane oil phase (FIG. 2a). These large drops are stabilized by the oil soluble Abil EM 90 surfactant. At the same time microemulsion oil droplets spontaneously form at the larger aqueous drop interface and occupy its internal volume. This is due to the adsorption of the two surfactants at the oil-water interface and a synergistic drop in the interfacial tension (See FIG. 2c), which facilitates the microemulsion formation. See e.g., Holyst, R.; Ciach, A.; Gozdz, W. T. in Computational Methods in Surface and Colloid Science; Borowko, M., Ed.; Marcel Dekker: New York, 2000; Vol. 2, p 685; Hu, Y.; Prausnitz, J. M. AIChE J. 1988 34, 814-824; Nagarajan, R.; Ruckenstein, E. Langmuir 2000, 16, 6400-6415; Palmer, K. M.; Morse, D. C. J. Chem. Phys. 1996, 105, 11147-11174; Aveyard, R.; Binks, B. P.; Clark, S.; Mead, J. J. Chem. Soc. Faraday Trans. 11986, 82, 125-142; and Aveyard, R.; Binks, B. P.; Mead, J. J. Chem. Soc. Faraday Trans. 11985, 81, 2169-2177, each of which is incorporated by reference. Because the CTAB is above the critical micellization concentration (CMC), the aqueous phase will also contain micelles (FIG. 2b). As stated above, the resulting drops are subject to solvent removal and silica polymerization (See previously incorporated Carroll, N. J.; Rathod, S. B.; Derbins, E.; Mendez, S.; Weitz, D. A.; Petsev, D. N. Langmuir 2008, 24, 658-661), which fossilizes the microemulsion and micellar structures, producing a bimodal porous network within the microparticles. As the solvent is removed the micelles may undergo further structural changes and form hexagonal structures (See, e.g. Lu, Y; Fan, H.; Stump A.; Ward, T. L.; Rieker, T.; Brinker C. J. Nature 1999 398, 223-226 and Brinker, C. J.; Lu, Y.; Sellinger, A.; Fan, H. Adv. Mater. 1999, 11, 579-585, both previously incorporated by reference).

The coexistence of micelle and microemulsion structures was checked by dynamic light scattering (DLS) analysis of the precursor TEOS/CTAB aqueous phase which was in contact for 48 hours with the oil phase containing Abil EM 90. During that time we observed the spontaneous formation of microemulsion droplets at the interface. The DLS results are shown in FIG. 3 where two well-defined peaks are present. The left peak represents the CTAB micelles, while the right peak is due to the microemulsion droplets. DLS measurements of the oil phase showed a single peak with maximum at ~30 nm and a long tail toward larger sizes.

Figure 4:
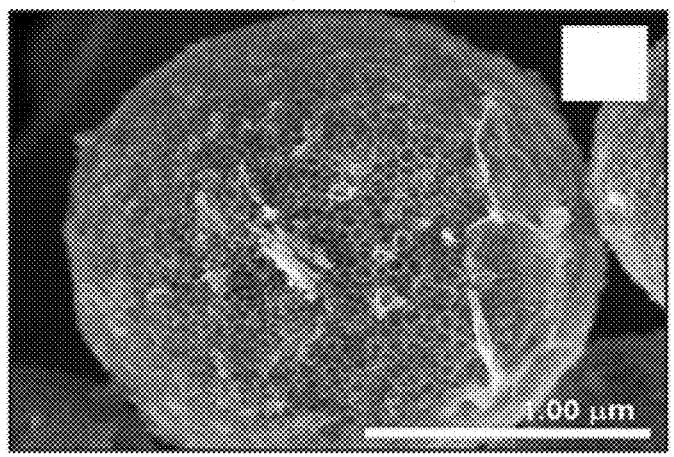
FIG. 4 is an SEM image of a silica particle surface with cavities (diameter ~40 nm) arranged as a honeycomb.
Figure 5:
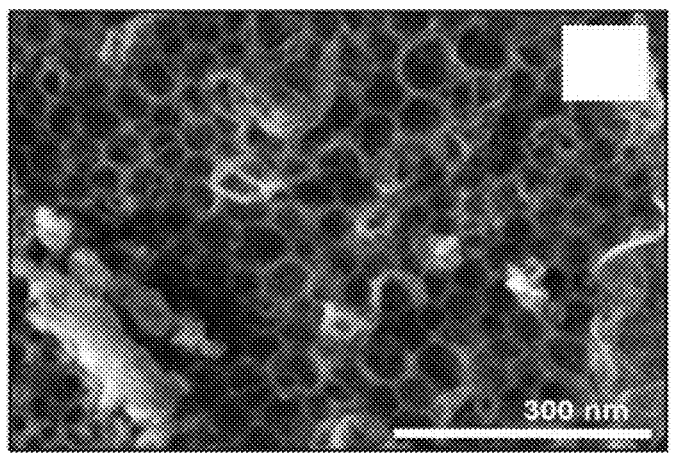
FIG. 5 is a closer-up SEM image of a silica particle surface with cavities (diameter ~40 nm) arranged as a honeycomb.
Figure 6:
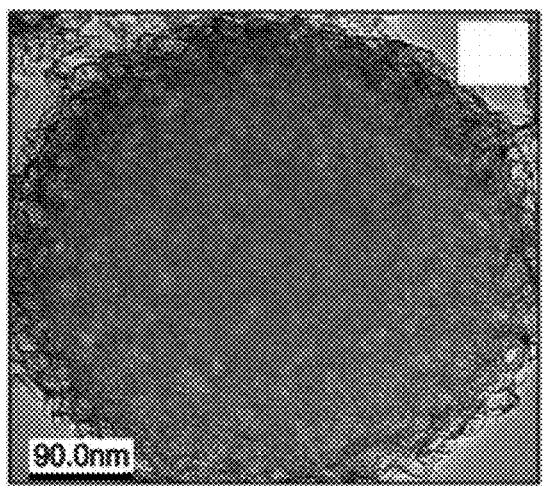
FIG. 6 is a TEM image of a silica particle showing open access to the internal porous network.
Figure 7:
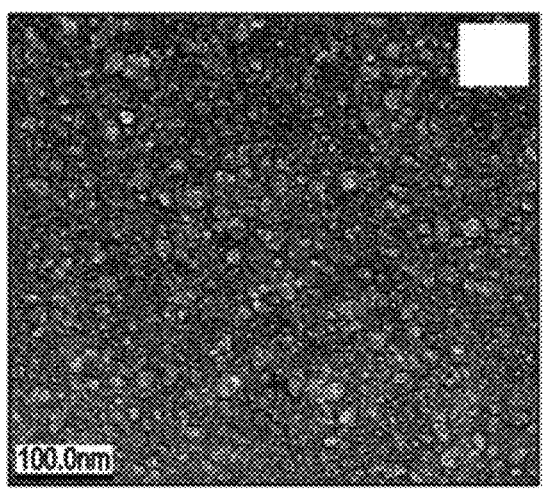
FIG. 7 is a cross-section of a silica particle showing microemulsion-templated pores (~30 nm in diameter) along with smaller micelle-templated pores (~5 nm in diameter).
Figure 8:
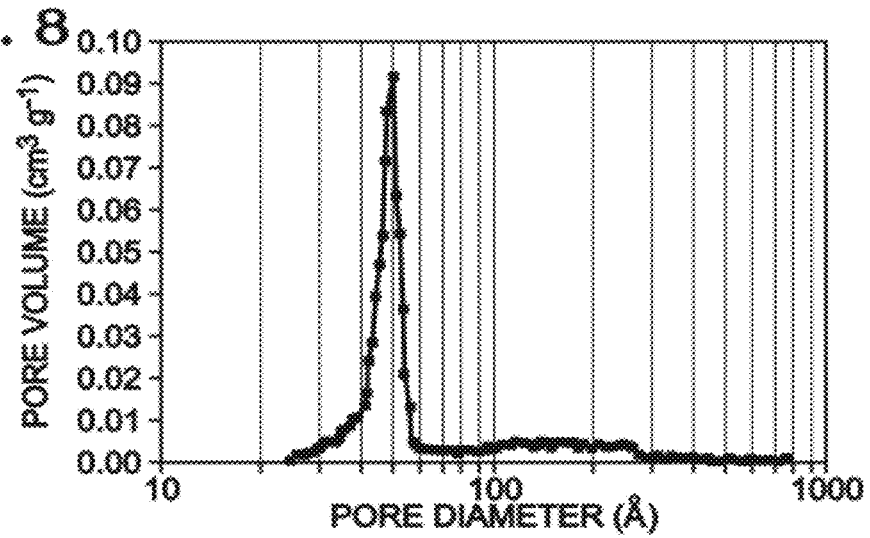
FIG. 8 is a graph showing NLDFT analysis of a nitrogen adsorption isotherm suggesting a bimodal pore distribution.

The obtained silica particles exhibit a honeycomb-like structure observed by scanning electron microscopy (SEM) (FIGS. 4 and 5), which shows the presence of cavities at the surface with diameters about 40 nm. A transmission electron microscopy (TEM) micrograph of the particles indicates open access to the porous network (FIG. 6), which, as discussed in greater detail below, facilitates impregnation of the interior with replica materials. It has been noted that open access to the pores is often not the case if only small surfactant micelles are templated (See e.g., Lu, Y; Fan, H.; Stump A.; Ward, T. L.; Rieker, T.; Brinker C. J. Nature 1999 398, 223-226; Brinker, C. J.; Lu, Y.; Sellinger, A.; Fan, H. Adv. Mater. 1999, 11, 579-585; Andersson, N.; Kronberg, B.; Corkery, R.; Alberius, P. Langmuir 2007, 23, 1459-1464; and Carroll, N. J.; Rathod, S. B.; Derbins, E.; Mendez, S.; Weitz, D. A.;

Petsev, D. N. *Langmuir* 2008, 24, 658-661, all previously incorporated by reference). The TEM image of a particle cross-section in FIG. 7 confirms the presence of the large pores in the interior of particles formed using the herein described techniques. The pore-size analysis (FIG. 8) suggests the presence of larger (~10-30 nm) and smaller (~5 nm) pores. The cavities at the particle surfaces (observed by SEM) are larger than the pores in the interior of the particle.

There is a discrepancy between the micellar and microemulsion sizes obtained by DLS and the respective pore dimensions. This can be due to shrinking of the silica upon solidification (See e.g., Schmidt-Winkel, P.; Glinka, C. J.; Stucky, G. D. *Langmuir* 2000, 16, 356-361, incorporated by reference). Another reason could be that DLS tends to overestimate the sizes for polydisperse samples (Pusey, P. N.; Tough, R. J. A. *Dynamic Light Scattering*; Pecora, R., Ed.; Plenum: New York, 1985, Ch. 4, incorporated by reference).

Figures 9, 10:
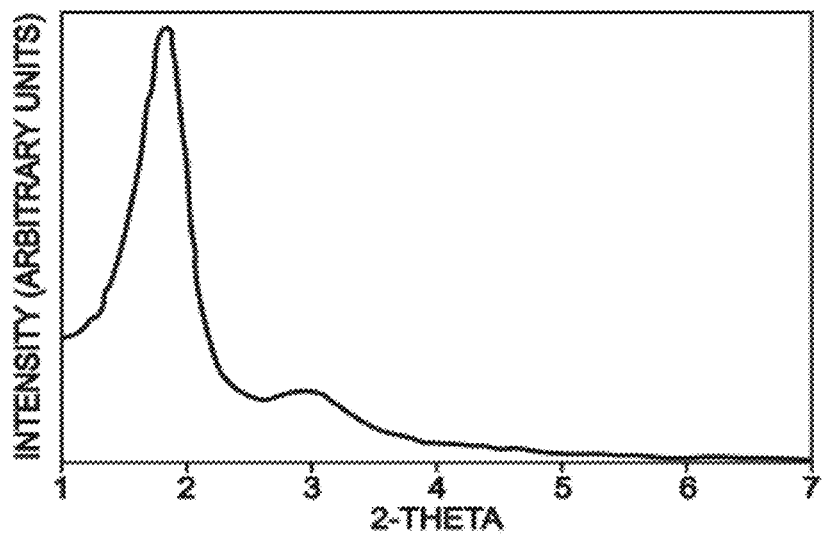
FIG. 9 shows an XRD pattern verifying the existence of hexagonally packed, micelle-templated pores.
FIG. 10 is a table showing BET and pore size evaluated from XRD measurements, showing the relationship between surfactant chain length and the resulting nanopore size.

The obtained silica microspheres have a Brunauer-Emmett-Tellert (BET) surface area and pore volume ~1000 m2/g and 1.098 cc/g respectively. Most of the surface area is attributed to the presence of the smaller nanopores. While the nanopores are not visible in the SEM image of FIG. 5, they are detectable in the TEM image of FIG. 7, as well as by adsorption measurements (FIG. 8), and powder X-ray diffraction (XRD) (FIG. 9).

Previously described methods have shown microemulsion templating to fabricate monolithic porous silica materials (See e.g., Schmidt-Winkel, P.; Glinka, C. J.; Stucky, G. D. *Langmuir* 2000, 16, 356-361; Schacht, S.; Huo, Q.; Voigt-Martin, I. G.; Stucky, G. D.; Schuth, F. *Science* 1996, 273, 768-771; Schmidt-Winkel, P.; Lukens, Jr., W. W.; Yang, P.; Margolese, D. I.; Lettow, J. S.; Ying, J. Y.; Stucky, G. D. *Chem. Mater.* 2000, 12, 686-696; and El-Safty, S. A.; Hanaoka, T. *Chem. Mater.* 2004, 16, 384-400, which are incorporated by reference). However, these materials did not have a subset of smaller nanopores. An advantage of our approach is in offering synthetic paths toward hierarchically porous materials with controlled pore-size, chemical composition, and physico-chemical properties at different length scales. This is particularly important for electrocatalysis and heterogeneous catalysis applications where fluid (gas or liquid) could easily penetrate the particles and travel inside through the large pores while the catalytic reaction occurs at the surface provided by the smaller pores. One can tailor the porous structure using Thiele-Modulus analysis. This is important for processes where no straightforward catalytic solutions are available to improve performance.

Accordingly, it will be appreciated that the smaller pores of the presently described particles may be utilized as capture regions for one or more desired reactants while the larger pores provide increased accessibility to the captured reactants. (That is, the accessibility is increased over what it would be in a particle that contained only pores having the smaller dimensions.) Furthermore, the accessibility (or transport properties) of the captured reactants can be prescribed, by controlling both the size and arrangement of the larger pores. Accordingly, the presently described particles provide unique and novel methods of introducing reactants to various systems in a manner where the reaction kinetics can be carefully controlled. For example, the particles of the present disclosure may be utilized as a drug delivery system, wherein dosage may be carefully controlled by precisely defining the sizes of the smaller and larger pores. Alternatively, and as described in greater detail below, the particles of the present disclosure may provide a novel electrocatalyst, wherein the electrocatalytic material is contained within the smaller pores and the transport properties of the material is controlled by the size of the larger pores.

Figure 11:
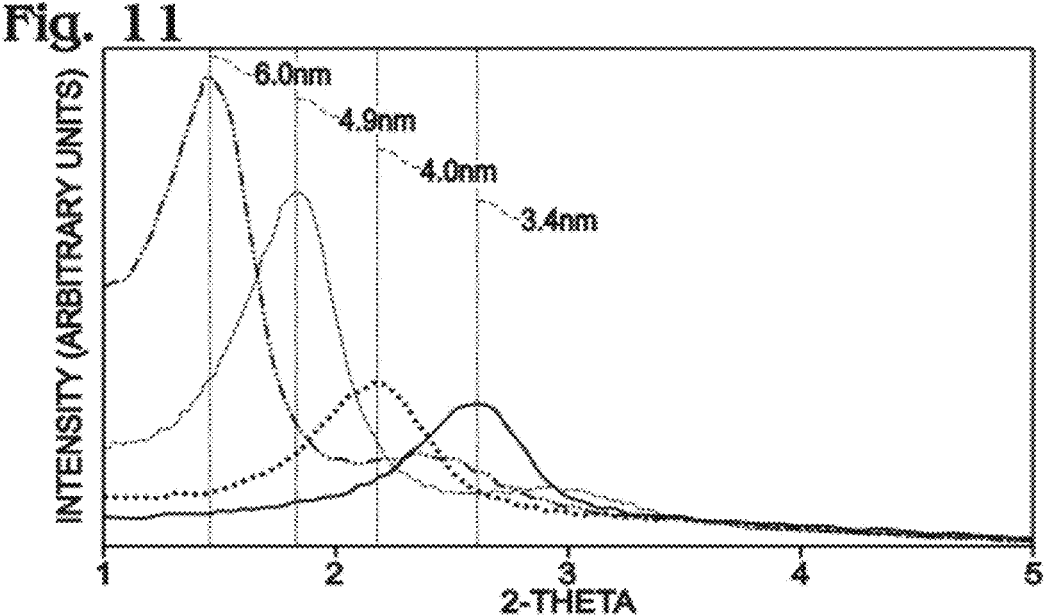
FIG. 11 depicts X-Ray diffraction patterns showing the differently-sized nanopores achieved by altering the size of the surfactant chain.

According to an embodiment, the size of the smaller nanopores can be controlled by changing the length of the water soluble surfactant. For example, when CTAB ($CH_3 (CH_2)_{15}N(Br)(CH_3)_3$ was used in conjunction with the exemplary method described above, the resulting nanopore size was ~4.9 nm. However, using surfactants with longer chains results in particles with larger nanopore sizes, and using surfactants with shorter chains results in smaller pore sizes. Specifically, a pore size of 6 nm was obtained when the water soluble surfactant chain was $2CH_2$ longer than in the CTAB and pore sizes of 4.0 and 3.4 were obtained when the surfactant chain was $2CH_2$ and $4CH_2$ shorter than CTAB, respectively. BET surface area along with the pore size data are shown in FIG. 10. X-Ray diffraction patterns, used to estimate size of the nanopores are shown in FIG. 11. Accordingly, using the methods described herein, it is possible to create particles with precisely-sized nanopores, by, for example, selecting the length of the water soluble surfactant used to synthesize the particles.

According to an embodiment, the size and arrangement of the larger pores can be achieved by controlling the average size of the micro-emulsion domains, which can be affected, for example, by selecting the appropriate combination of surfactants, water and oil combination, ionic strength (i.e. salt concentration), temperature and/or pH. By altering one or more of these factors, the resulting pore morphology or tortuosity can be selected, as desired.

According to another embodiment, the biporous particles described above can be used as templates for the fabrication of replica particles having precise structural characteristics. The particles of the present disclosure are well suited for this application, as the large pores in the microemulsion templated particles allow for effective infiltration with precursor material, resulting in precise replicas of the particles. As shown, replica particles may be formed by templating the original biporous particles with a desired material. Furthermore, the templating approaching may be combined with other methods such as impregnation and/or precipitation to yield structures with controlled porosity, surface chemistry, hydrophilicity, hydrophobicity, and/or a combination thereof.

These replica particles (or the original particles themselves) may then be impregnated or infiltrated with a desired material to form a wide variety of products including, but not limited to, alloys, mixed phases, various moieties/species, including coordinated moieties or species such as nitrogen species coordinated with metals such as cobalt, iron, nickel or the like.

Accordingly, in another embodiment, the present disclosure provides novel hierarchically-porous carbon structures, which, as an example, may serve as an electrocatalyst support structure. Furthermore, the biporous carbon structures may be impregnated with an electrocatalytic material, such as platinum, forming a novel electrocatalyst. The development of hierarchically-porous structured electrocatalysts and their supports can effectively address some of the performance limitations of fuel cells. The design of electrocatalysts with a high surface area and a large amount of accessible three-phase sites could potentially result in higher current densities. Furthermore, highly porous structures can effectively minimize transport limitations, thus increasing the accessibility of the active sites by gas and liquid phases. In addition, the durability requirements of the fuel cells can be met by improving the corrosion stability of the current supports or design of novel resistant supports. Moreover, small pores can effectively lock Pt catalyst particles within a desired size range (see below) and limit their growth degradation during operation.

Figure 12:
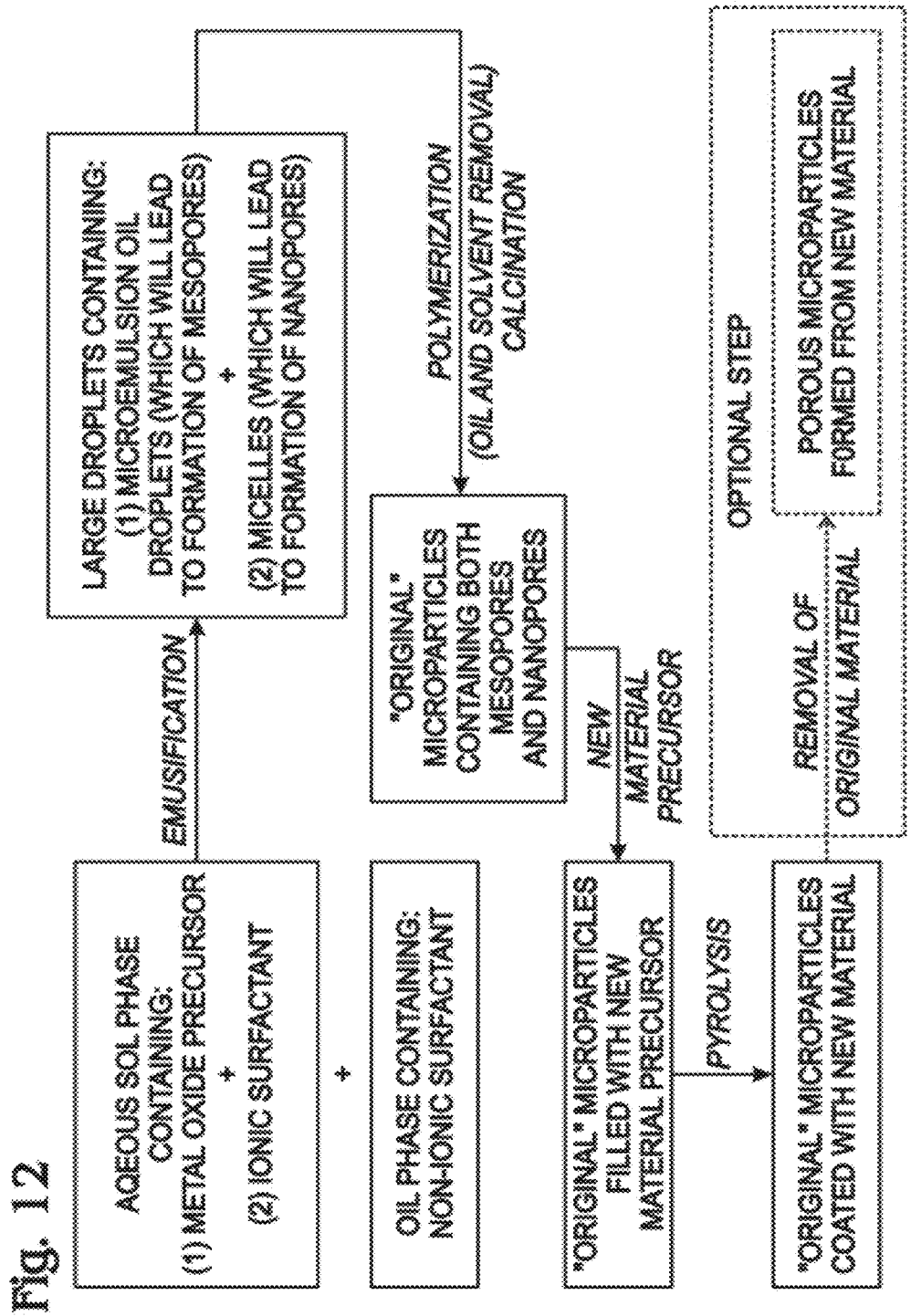
FIG. 12 is a flowchart showing a method of replica particle formation according to an embodiment of the present disclosure.

Turning now to FIG. 12, a method of forming "lost wax" carbon replicas of biporous microparticles, is shown. According to an embodiment, biporous microparticles are formed using the methods described above. Carbon precursor (sucrose) is incorporated into the pores of biporous microparticles by dry impregnation. The material is then pyrolyzed and the support material (i.e. the original microparticles) removed, for example by etching in KOH solution. The resulting carbon material consists of particles with meso-structure that is a "lost-wax" replica of the original particles.

According to a specific example, a carbon precursor was prepared by dissolving 475 mg of sucrose in 1 ml of 2M $H_2SO_4$ and then adding 2.6 ml of acetone. The addition of acetone was necessary to obtain good wetting of the silica particles with the sucrose solution. The resulting solution was added to 200 mg of biporous silica particles in increments of 100 µl and allowed to dry between additions. After all the solution was added to the silica particles, the resulting particles were dried in the oven at 70° C. overnight. This was followed by pyrolysis at 900° C. in $N_2$ atmosphere for 4 hours, ramp rate 3° per min. After pyrolysis, the silica was etched in 6M KOH for 4 days.

Dynamic light scattering (DLS) studies were acquired on a Nanotrac NPA250 dynamic light scattering instrument from Microtrac Inc. The measurements were separately performed on the two macroscopic phases (aqueous solution of the CTAB and silica precursor that had been in contact with the oil containing the ABIL EM 90). After waiting for 48 hours the oil phase spontaneously dispersed into the water in the absence of any additional stifling. The X-ray powder diffraction (XRD) patterns were obtained on a Scintag diffractometer (Cu KR radiation). Transmission electron microscopy (TEM) was conducted on JEOL 2010 and 2010F instruments, and scanning electron microscopy (SEM) was done on a Hitachi S-800 instrument. Nitrogen (77.4) adsorption/desorption measurements were performed on a Quantochrome Autosorb-1-MP instrument. Prior to analysis, the sample was outgassed overnight at 120° C. The adsorption data were analyzed using NLDFT approach and cylindrical pore model.

Figure 13:
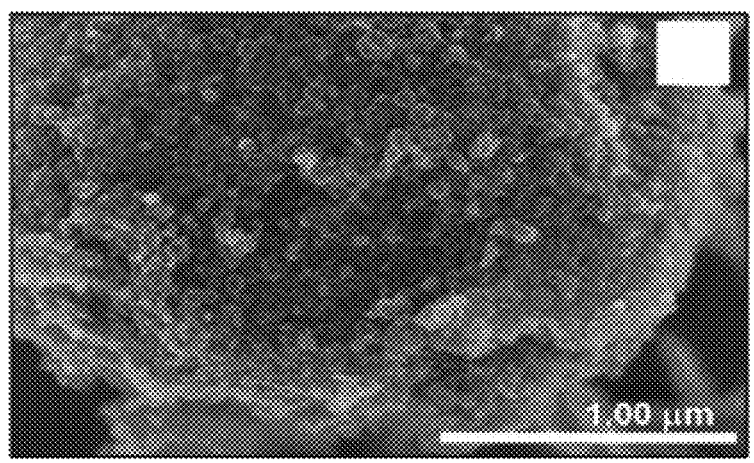
FIG. 13 is an SEM image of a carbon particle surface.
Figure 14:
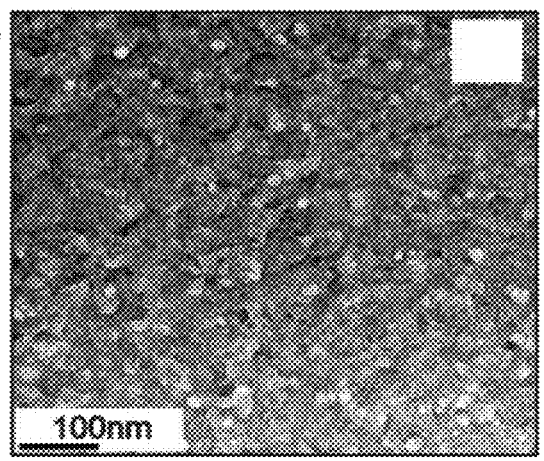
FIG. 14 is a TMEO image of a cross-section of a carbon particle showing the internal structure.

Each grain of carbon that is visible in the SEM image (FIG. 13) corresponds to a microemulsion droplet that was formed in the first step of the fabrication of the silica microspheres. It is important that after the removal of the silica matrix the remaining microparticles do not disintegrate. The internal meso-structure of the carbon particle can be observed in the TEM micrograph of the cross-section of a carbon particle (FIG. 14). The smaller pores of the silica were also filled with carbon precursor, creating "bridges" that provide the structural integrity to the carbon particle after the removal of silica. The BET surface area of these particles is 700 m2/g, which is comparable to commercial carbon black materials. Pore volume of carbon material is 0.382 cc/g. The size of the silica particles and the thickness of the walls of the large pores determine the dimensions and porosity of the carbon particles. The internal voids will improve the mass transport through the material when used as a support in the fuel cell. Further increasing the BET surface area and extension of the open-structure frame is possible by optimization of the synthesis procedure that includes varying the precursor and/or its amount to form partially instead of fully filled structures. For example, the precursor solution viscosity can be manipulated to obtain desired structure.

These carbon nanostructured materials represent a unique scaffold to support noble metals such as platinum. A main goal in modern catalysis is to reduce the loading of noble metal while maintaining high activity. Accordingly, the structures of the present disclosure provide a significant advancement in achieving these goals.

Figure 16:
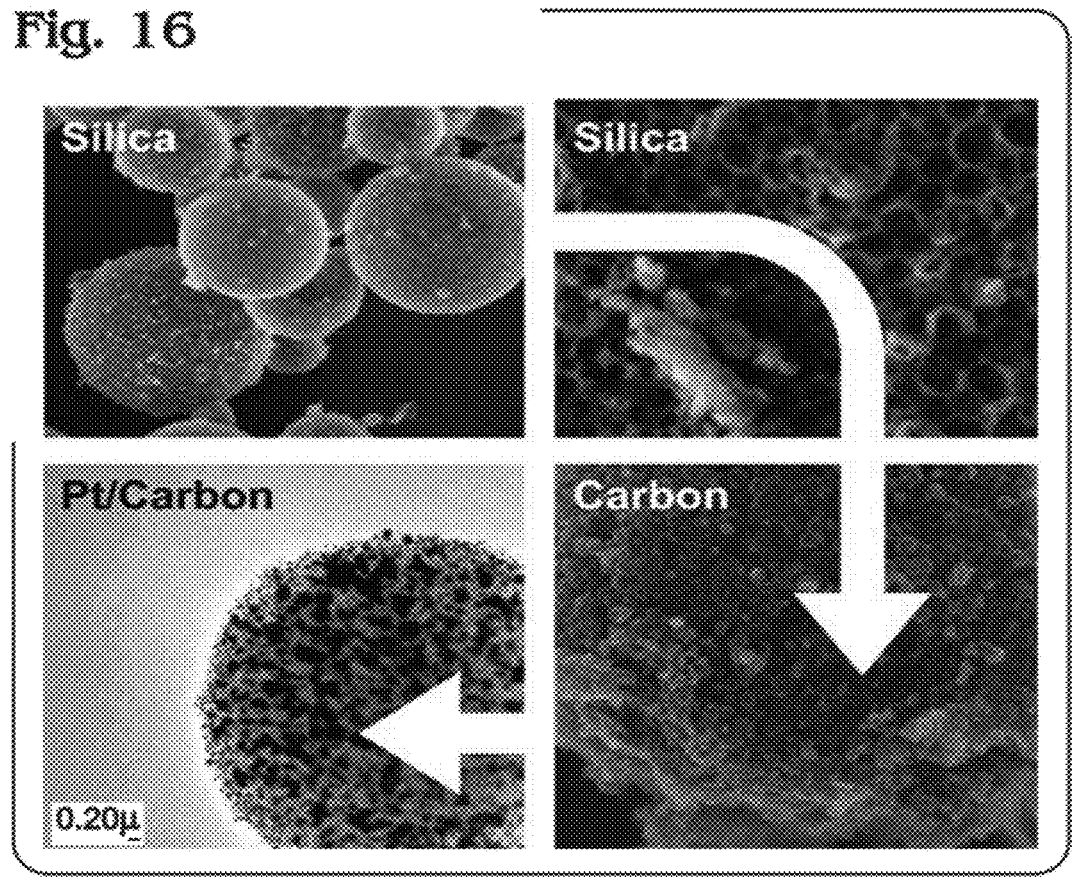
FIG. 16 is a picture flowchart showing particles formed during the various stages of the method of FIG. 15.

Turning now to FIG. 15, a novel method for forming platinum-bearing carbon particles is shown. In this method, silica particles are formed using the methods previously described. The silica particles are then impregnated with carbon and platinum precursors and the silica removed. The resulting structure is a highly porous carbon particle decorated with platinum nanoparticles of a specific size. FIG. 16 is a flowchart showing the various structures formed during this process.

Figure 17:
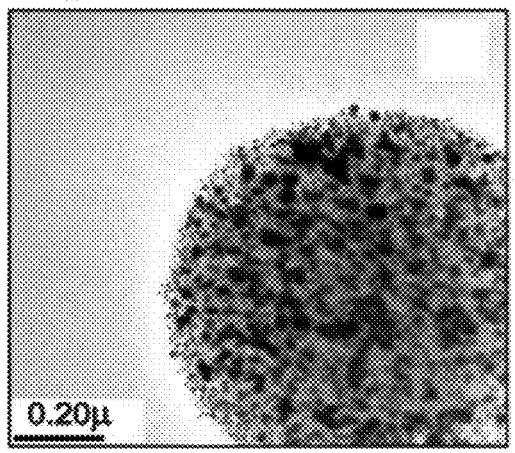
FIG. 17 is a TEM image of a templated carbon particle decorated with platinum nanoparticles.
Figure 18:
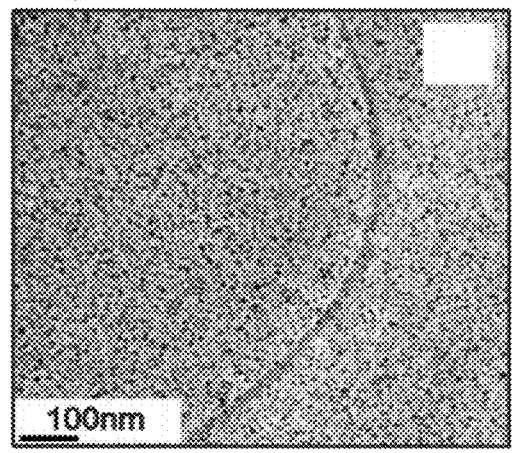
FIG. 18 is a TEM image of a cross-section of a templated carbon particle decorated with platinum nanoparticles showing the internal structure and dispersion of the nanoparticles.

Infiltration of platinum precursor immediately after the carbon precursor and preceding the pyrolysis step fixes the size of metal particles in the range of 3-6 nm by incorporation of the metal particles in the small nanopores. TEM analysis of the carbon particles decorated with platinum nanoparticles and their cross-sections has demonstrated a uniform distribution of the platinum throughout the interior (FIGS. 17-19). The high surface area of the carbon material was preserved after decoration with platinum. The measured BET was above 600 m2/g for materials with Pt loading of 10-30 wt. %. Templated Pt/carbon electrocatalyst was tested in Rotating Disk Electrode (RDE) configuration and demonstrated promising results (see FIG. 20).

The pore size distribution of the silica nanopores described in the various platinum electrocatalytic examples herein is around 5 nm, which serves to lock the platinum particles in the nanosize range, also around 5 nm. As described above, it is also possible to increase or decrease the size of the nanopores, as desired. Because the size of the platinum particles is directly related to the size of the nanopores, decreasing the size of the nanopores will lead to the decrease in the platinum particle size, and thus a better (e.g. more cost-effective and efficient) utilization of the noble metal. Correspondingly, increasing the size of the nanopores would result in increased platinum particle size, should that be desirable.

Another potential benefit of the nanoporous network is related to the degradation of electrocatalyst during fuel cell operation. Degradation of electrocatalysts is closely related to the growth of platinum particles and their detachment from the carbon support. In the case of platinum supported on templated carbon, these processes might be less pronounced since the platinum particles are actually locked in the pores.

According to a specific example, synthesis of carbon particles decorated with platinum nanoparticles was done in a manner similar to the carbon particle synthesis. First, biporous silica particles were formed using the techniques previously described. The biporous silica particles were then impregnated with the carbon precursor sucrose. Then, platinum precursor, $H_2PtCl_6$, dissolved in 2M $H_2SO_4$ and mixed with acetone, was added to silica particles filled with sucrose. The resulting material was heat-treated, pyrolyzed and etched at the same conditions as the silica-carbon material. Then material was filtered, washed five times with DI water and dried in the oven at 70° C.

Figure 23:
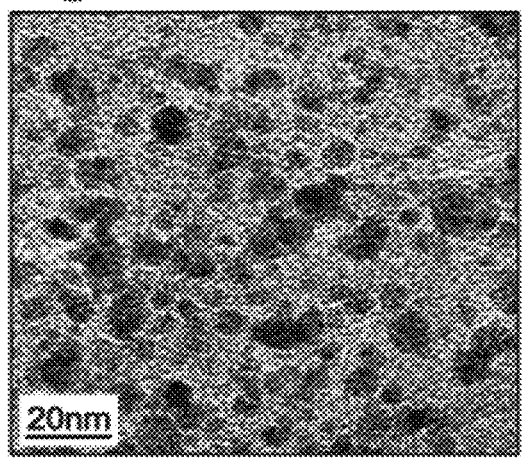
FIG. 23 is a high-magnification image of the material of FIG. 22.

According to another embodiment, it is possible to control the distribution and particle size of material(s) impregnated in the supporting biporous structure by altering the impregnation procedure and/or altering the loading of the material(s) being impregnated. For example, when a biporous silica microparticle was simultaneously impregnated with platinum and carbon precursors, the amount of surface platinum, as detected by XPS was quite low (FIG. 21). Also, a wide distribution of platinum particle size was obtained resulting from locking of platinum not only in the nanopores but also in the mesopores. When platinum precursor was introduced simultaneously with carbon precursor but after most of carbon precursor was already loaded into silica, the amount of surface platinum increased from 0.6% to 1.1% and the average particle size of platinum decreased. Finally, the highest amount of platinum on the surface (about 1.7%) was detected when impregnation with platinum precursor was done after impregnation with carbon precursor. Also, the particle size distribution became narrower and overall dispersion was more homogeneous. The TEM micrograph in FIG. 22 shows the templated carbon particle decorated with platinum, 30 wt. %. The high-magnification image of the same material in FIG. 23 shows that platinum particles are in the 3-8 nm range and are densely packed. Analysis of the cross-section of the particle shows that platinum particles are very well dispersed throughout the entire carbon particle.

Figure 24:
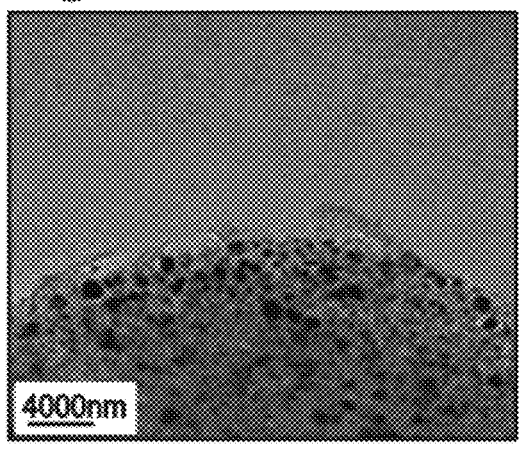
FIG. 24 is a TEM image of 10 wt. % Pt/Templated Carbon material.
Figure 25:
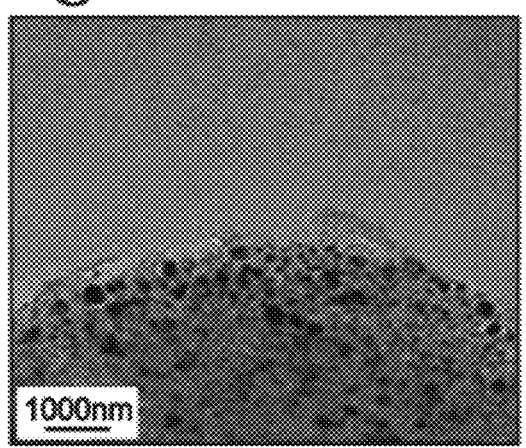
FIG. 25 is a high-magnification image of the material of FIG. 24.
Figure 26:
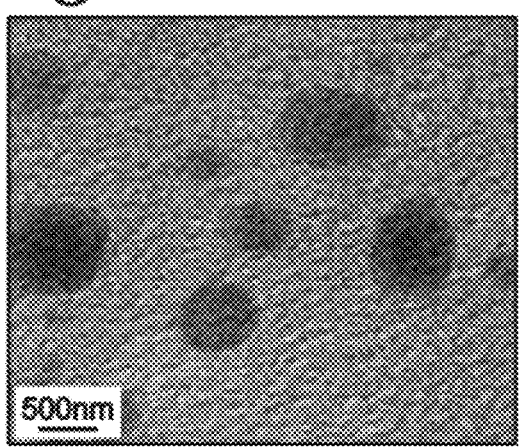
FIG. 26 is an even higher magnification image of the material of FIGS. 24 and 25.

As stated above, loading can also affect the size and dispersion of the impregnated material. For example, FIG. 21 also shows the changes in the XPS elemental composition of materials when biporous silica microparticles were templated with carbon and three different loadings of platinum. As shown, a decrease in the platinum loading results in the decrease in the amount of platinum detected on the surface with XPS. For instance, the relative concentration of platinum decreases from 1.7% in 30 wt % material to 1.0% and 0.4% in 20 wt. % and 10 wt. % Pt/Templated Carbon materials, respectively. A reduction in the platinum amount results in less dense dispersion of platinum particles and is accompanied by reduction in the size of the platinum particles, as evident from the TEM analysis of 10 wt. % Pt/Templated Carbon material, shown in FIGS. 24-26.

Figure 27:
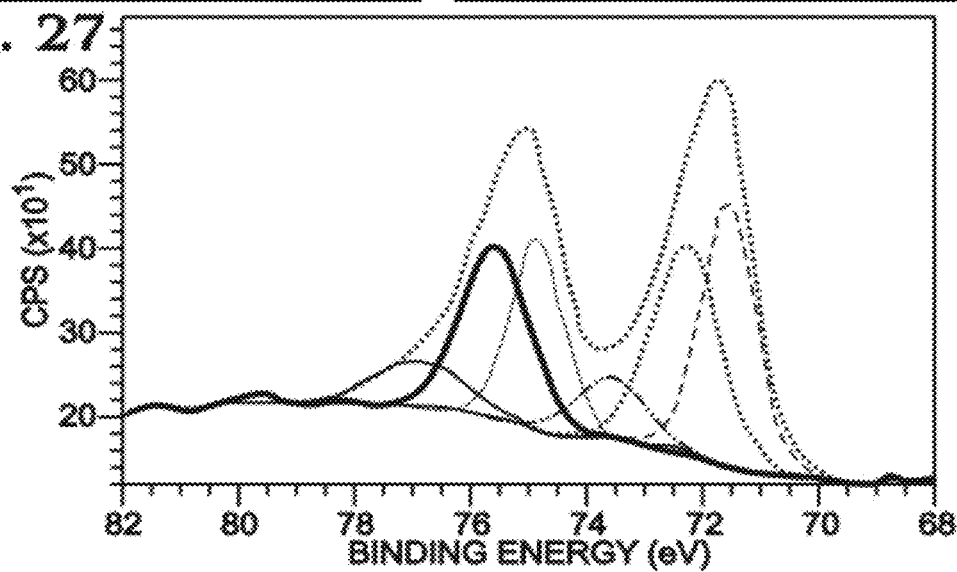
FIG. 27 is a graph showing a representative high-resolution Pt 4f spectrum and its deconvolution.

A representative high-resolution Pt 4f spectrum and its deconvolution are shown in FIG. 27. The platinum 4f spectrum consists of two components ($4f_{7/2}$ and $4f_{5/2}$) that are separated by 71.2 eV. Each of the components was curve-fitted with 3 peaks. Peaks at 71.5 eV (7/2 component) and 74.8 eV (5/2 component) correspond to metallic Pt. The next double, peaks at 72.3 eV (7/2 component) and 75.6 eV (5/2 component), are due to platinum hydroxides, $Pt(OH)_x$. Finally, the last double, peaks at 73.4 eV (7/2 component) and 76.7 eV (5/2 component), are the contributions of platinum oxides, $PtO_x$. XPS analysis revealed that platinum distribution between metallic, hydroxide and oxide forms is 35%, 48% and 16% respectively, and is about the same for all Pt/Templated Carbon materials discussed above. This indicates that only elemental concentrations were affected by the variations in the impregnation steps and platinum loading.

Figure 28:
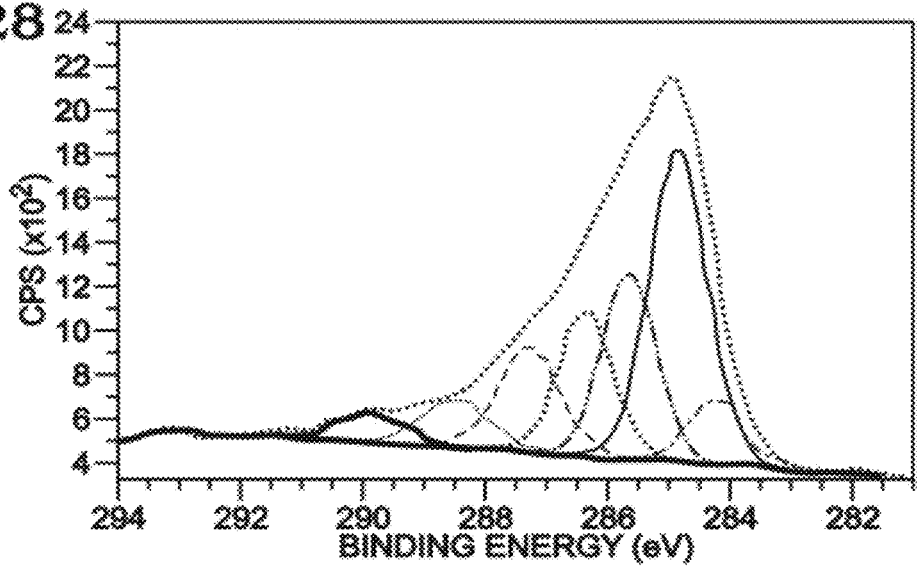
FIG. 28 is a graph showing a high-resolution C1s spectrum typical of templated carbon decorated with platinum nanoparticles.

FIG. 28 shows a high-resolution C1s spectrum typical of templated carbon decorated with platinum nanoparticles. Several types of carbon species can be distinguished in the C1s spectrum. Amorphous carbon (C—C, at 285 eV) is the major form, while graphitic carbon (C=C, 284.3 eV) is the minor form. Other peaks are due to secondary carbon (C*—C—O, at 285.6 eV) and carbon bonded to oxygen (C—O—C, C—OH, C=O, COOH, located in the range of 286-290 eV). The peak at 291 eV is a shake-up peak, indicative of aromatic/graphitic structure. Only small variations in the carbon speciation were observed for materials with different loading of platinum.

Figure 29:
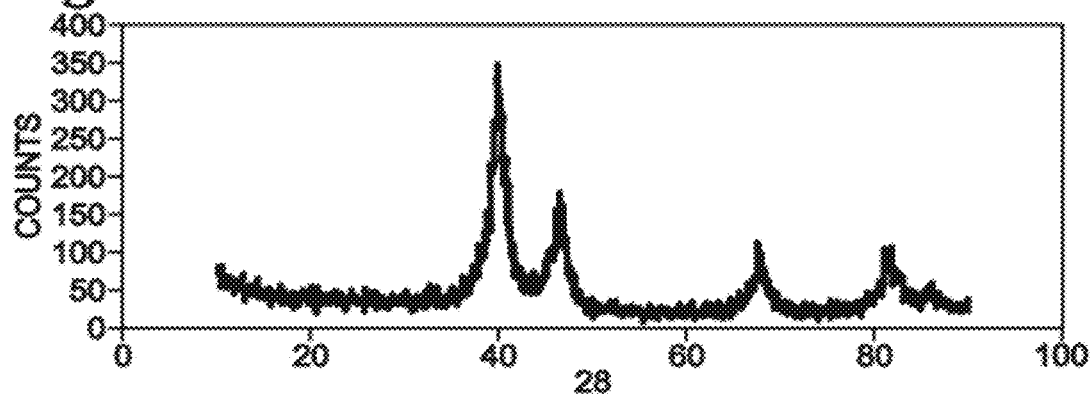
FIG. 29 is an XRD pattern for the 30 wt. % Platinum/Templated Carbon material.
Figure 30:
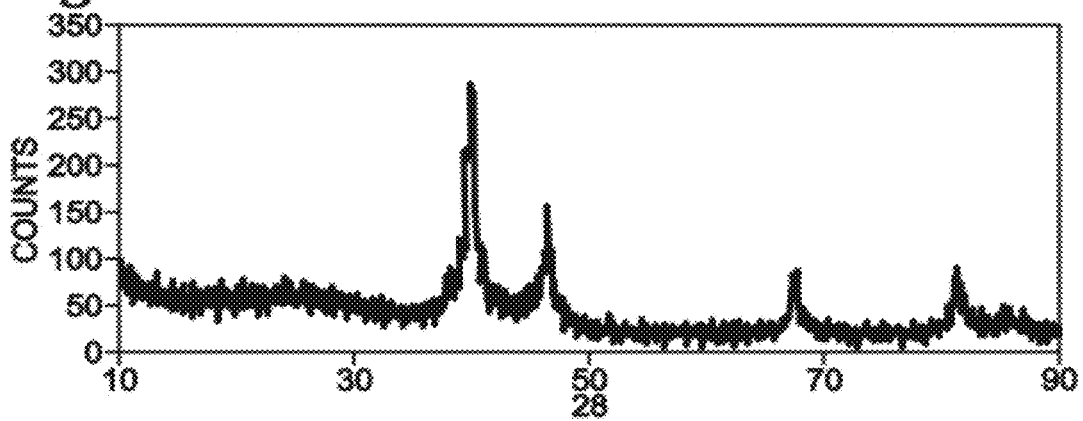
FIG. 30 is an XRD pattern for the 10 wt. % Platinum/Templated Carbon material.

XRD patterns for the 30 wt. % and 10 wt. % Platinum/Templated Carbon materials shown in FIGS. 29 and 30 are characteristic of carbon-supported platinum electrocatalyst.

Figure 31:
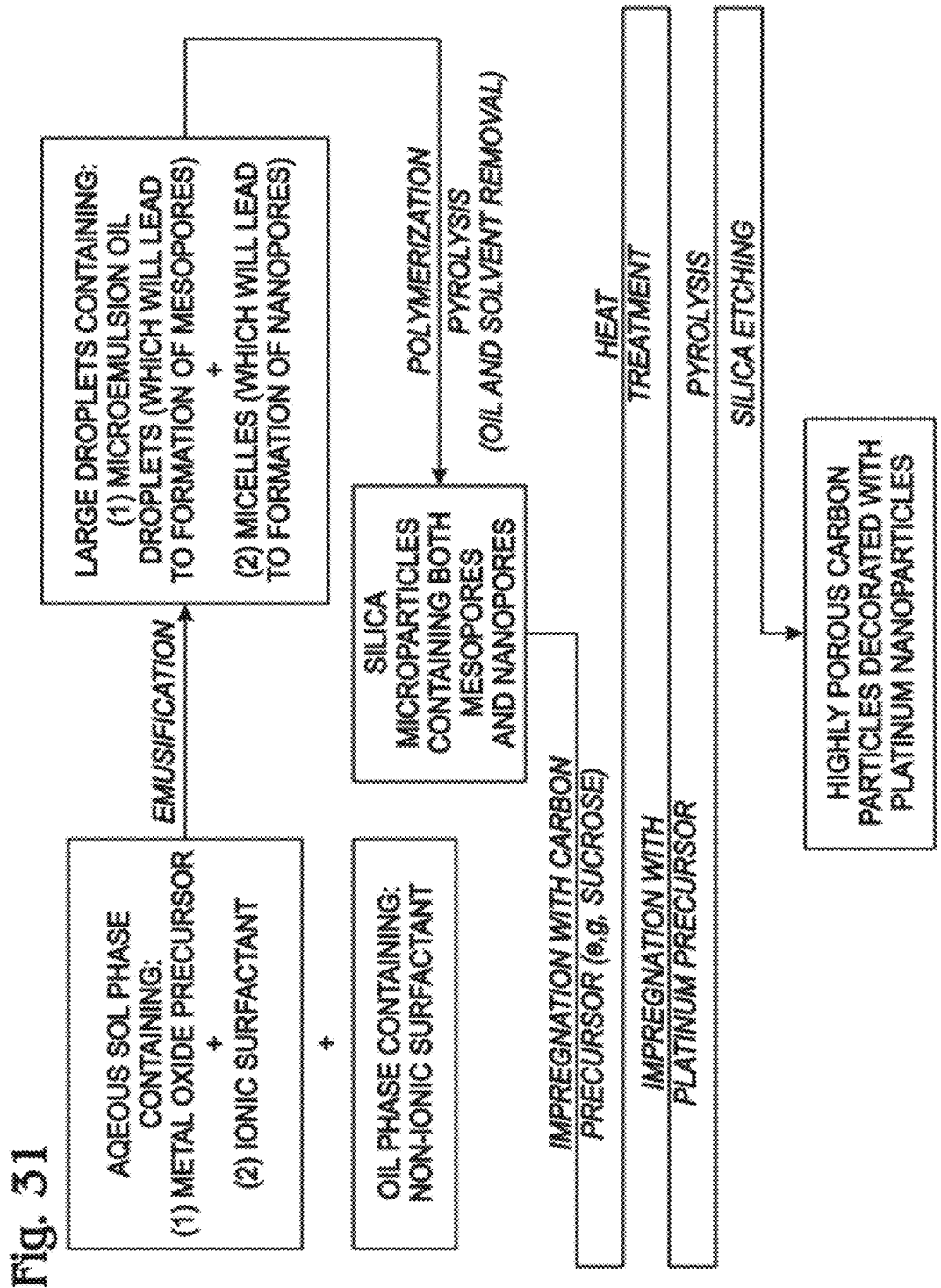
FIG. 31 is a flowchart showing another method of forming platinum decorated carbon particles utilizing an intermediate heat treatment step according to an embodiment of the present disclosure.

In some embodiments it may be desirable to improve the accessibility of the impregnated material. In such a case it may be desirable to include an intermediate heat treatment after impregnation of the supporting material (e.g. sucrose precursor) but before impregnation with the catalytic material (e.g. platinum precursor), as shown in FIG. 31.

Figure 32:
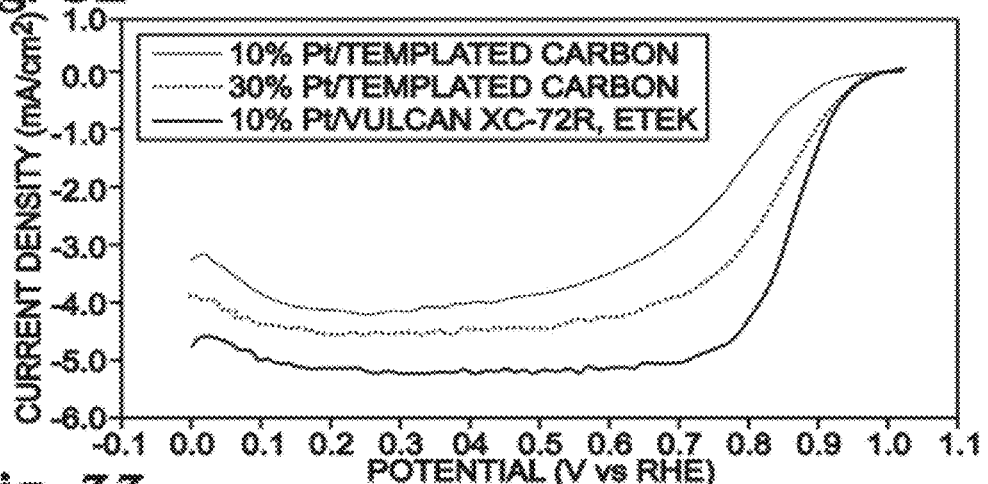
FIG. 32 is a graph showing the oxygen reduction polarization curves for 10 wt. % and 30 wt. % Pt/TC materials.
Figure 33:
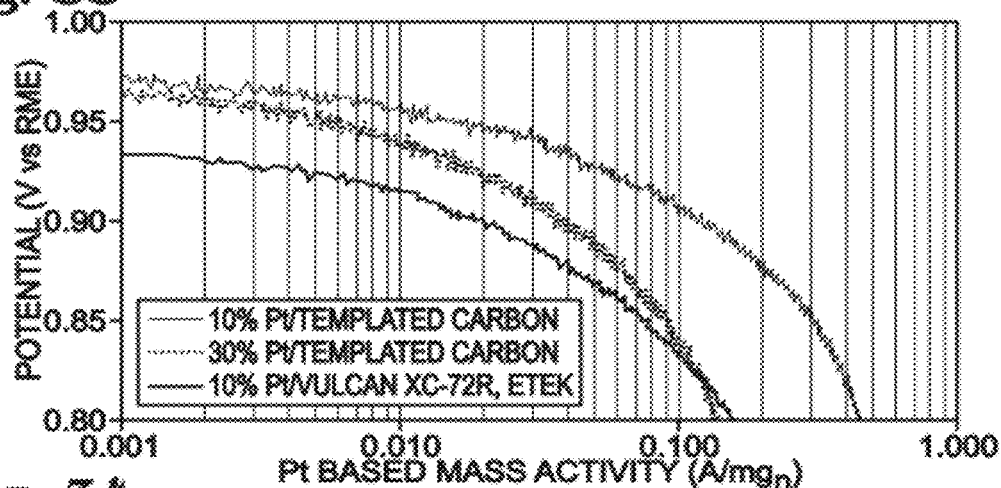
FIG. 33 is a graph showing the mass-normalized kinetics curves for the materials of FIG. 32.

For example, when a template Pt/carbon electrocatalyst formed using the methods described herein without an intermediate heat treatment were tested in a Rotating Disk Electrode (RDE) configuration, both a 10 wt. % and a 30 wt. % material showed lower performance than commercial 10 wt. % Pt/Vulcan. Oxygen reduction polarization curves for 10 wt. % and 30 wt. % Pt/TC materials are shown in FIG. 32. Lower than expected diffusion limited currents could be indicative of either a lower number of transferred electrons or diffusion limitations in the pores of the templated material. Mass-normalized kinetic currents for these materials are shown in FIG. 33. It is clear that the intrinsic catalytic activity of templated electrocatalysts is lower than that of commercial, Vulcan supported, electrocatalysts. Furthermore, a comparison of templated electrocatalysts with different Pt loading reveals that material with higher Pt loading is a better catalyst than material with lower Pt loading. This observation might indicate that the limited performance of the templated electrocatalysts is caused by contamination, which effects low Pt loading material more than high Pt loading material.

Figure 34:
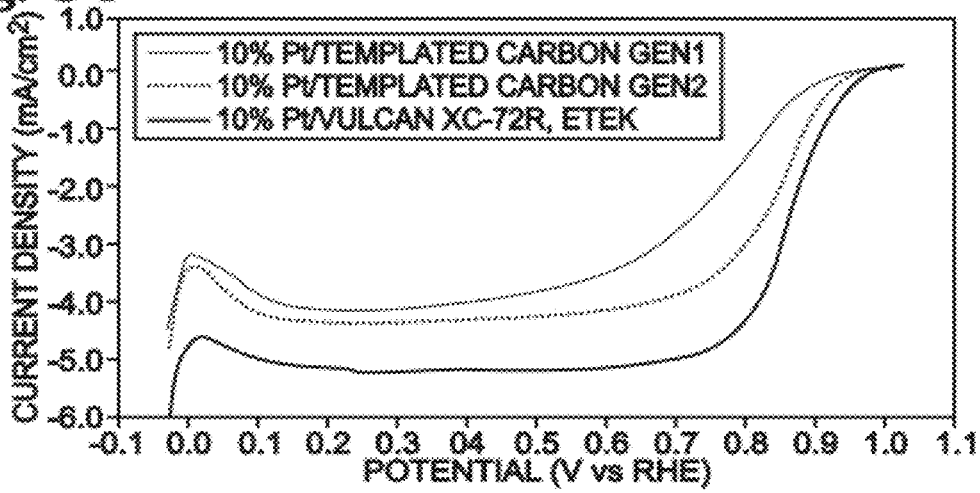
FIG. 34 is a graph showing ORR activity of Pt/TC catalyst made without (GEN 1) and with (GEN2) an intermediate heat-treatment step after impregnation with sucrose precursor but before impregnation with platinum precursor.
Figure 35:
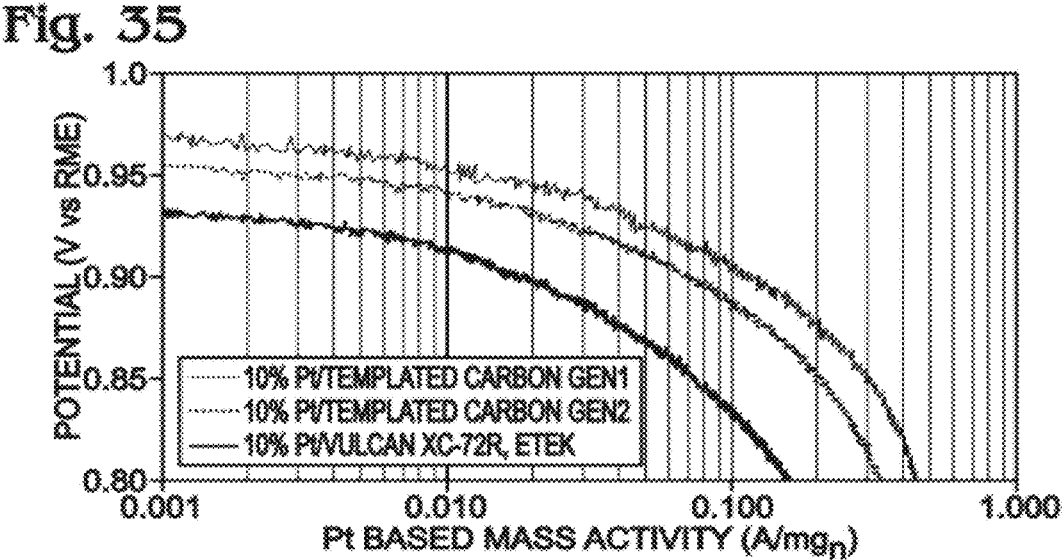
FIG. 35 is a graph showing the mass-normalized kinetic currents measured for the materials of FIG. 34.

When 10 wt. % Pt/TC catalyst was made including an intermediate heat-treatment performed after impregnation with carbon precursor but before impregnation with platinum precursor, ORR activity at 0.9V, increased from 0.02 A/mgPt to 0.075 A/mgPt, even though there was only a slight improvement in the diffusion limited region of the ORR polarization curve (FIG. 34). However, the advancement in the mass-normalized kinetic currents measured for this material, shown in FIG. 35 is much more prominent. This result is a major improvement in the performance of the templated electrocatalyst as compared to initial results. The initial set of materials, made without an intermediate heat-treatment is identified in the figures as the first generation of templated electrocatalysts (GEN1). Materials made using intermediate heat-treatment are identified as second generation of templated electrocatalysts (GEN2).

Figure 36:
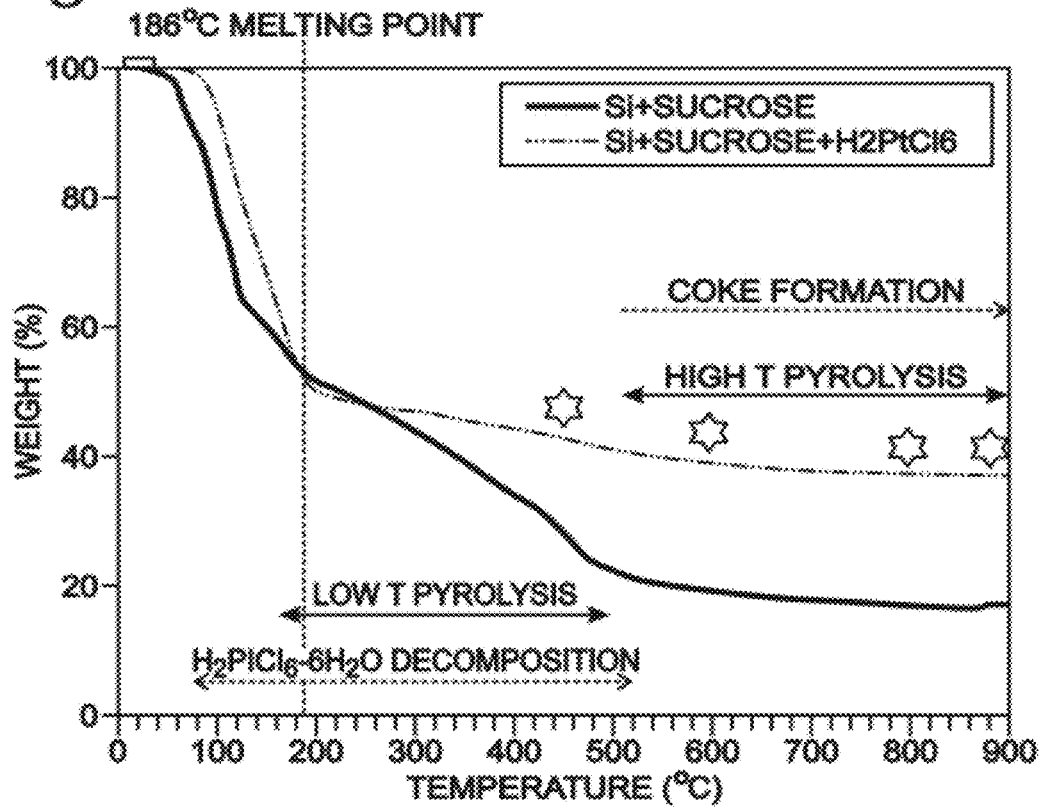
FIG. 36 is a graph depicting TGA curves showing the weight losses associated with the changes in temperature for two unpyrolyzed materials: silica impregnated with sucrose and silica impregnated with sucrose and chloroplatinic acid.

Further improvement in ORR performance may be obtained by optimizing the pyrolysis conditions. In one example, the pyrolysis conditions were simulated in a TGA instrument. The weight losses associated with the changes in the temperature for two unpyrolyzed materials, silica impregnated with sucrose (alone) and silica impregnated with sucrose plus chloroplatinic acid are given in FIG. 36. Multiple slopes, observed in the TGA graph of the sucrose (alone) containing material indicate that decomposition of the sucrose to carbon is a multiple-step process that is finished when the temperature reaches about 500° C. The temperature range of the decomposition of chloroplatinic acid and formation of metallic platinum particles is a function of the reducing agent. Here, as pyrolysis is done in a $N_2$ environment, the only reducing agent present is a carbon precursor. The decomposition of sucrose plus chloroplatinic acid is also complete when the temperature reaches 500° C. Melting of the sucrose during its decomposition might result in coverage of the platinum, decreasing the amount of platinum accessible for participation in the oxygen reduction. Accordingly, partial decomposition of sucrose at slightly elevated temperatures prior to impregnation with platinum precursor may lead to improved accessibility of platinum.

Another problem that may affect the activity of the catalytic material is coking. Coking occurs at temperatures of 500° C. and higher, and is known to be catalyzed by metals, including platinum. The coking process cannot be distinguished in the TGA curves shown in FIG. 36. In order to understand if coking is indeed a problem relevant to performance of templated materials, the temperature of the pyrolysis can be varied. The optimum temperature will be the temperature at which the decomposition of both precursors is complete, the conductive carbon phase is formed, and the coking is minimized. The lower end of suitable temperatures to explore is the temperature when decomposition of the precursor materials is complete. Accordingly, for structures that will be formed from carbon and platinum, 500° C. is the lower end of the temperature range that should be investigated as this is the temperature when decomposition of both chloroplatinic acid and sucrose is complete.

Figure 37:
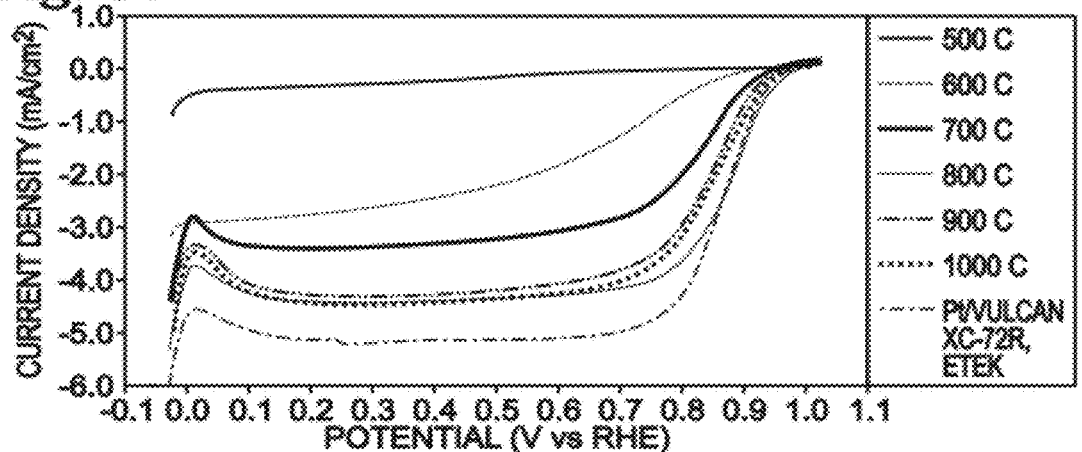
FIG. 37 is a graph showing the RDE results for materials pyrolyzed at 500° C., 600° C., 700° C., 800° C., 900° C. and 1000° C.
Figure 38:
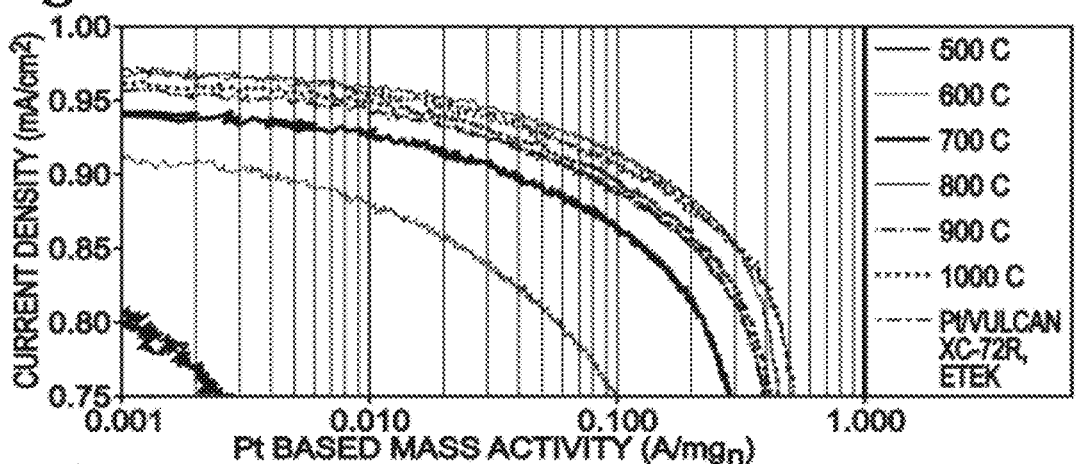
FIG. 38 is a graph showing the mass-normalized kinetic currents measured for the materials of FIG. 37.

RDE results for materials pyrolyzed at 500° C., 600° C., 700° C., 800° C., 900° C. and 1000° C. are shown in FIG. 37. FIG. 38 is a graph showing the mass-normalized kinetic currents measured for the materials of FIG. 37. Pyrolysis temperatures lower than 800° C. result in very poor ORR performance, the consequence of poor conductivity of the carbon support. This suggests materials utilization or the efficiency per gram of the plutonium and reveals the potential for higher utilization due to accessibility. The best ORR performance was obtained when pyrolysis was conducted at 800° C. Materials for which the temperature of the pyrolysis exceeded 800° C., also exhibited significantly higher ORR performance as compared to materials pyrolyzed at lower temperatures. The performance of 800° C., 900° C. and 1000° C. treated materials in the diffusion limited region is quite similar. However, when they are compared in terms of the mass-normalized kinetic currents, the electrocatalytic activity of materials pyrolyzed at 900° C. and 1000° C. is substantially lower than that of materials pyrolyzed at 800° C. This indicates that the number of electrons transferred during oxygen reduction at temperatures above 800° C. decreases due to an increase in the rate of coke formation. The performance of the GEN2 800° C. treated material is very similar, especially in the kinetic region, to that of the commercial Pt/Vulcan catalyst.

Figure 39:
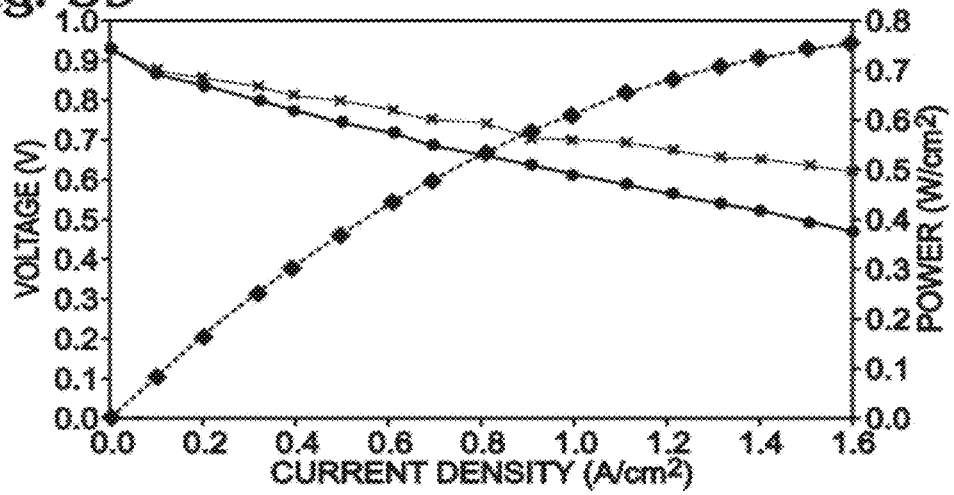
FIG. 39 is a graph showing the polarization and power curves obtained for a GEN2 10%/TC electrocatalysts formed using the methods described herein.

The material that showed the best RDE performance was also evaluated in the MEA. Polarization and power curves obtained for the GEN2 10 wt % TC electrocatalysts are shown in FIG. 39.

Figure 40:
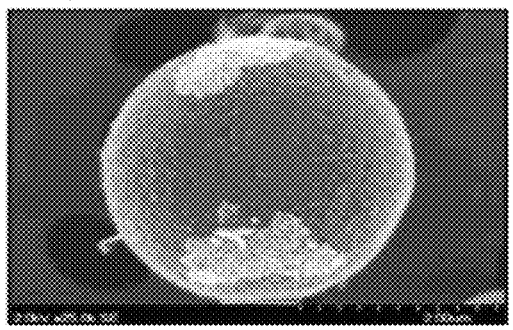
FIG. 40 is an SEM image of the 10 wt % Pt/Templated carbon made by impregnation of previously pyrolyzed templated carbon.
Figure 41:
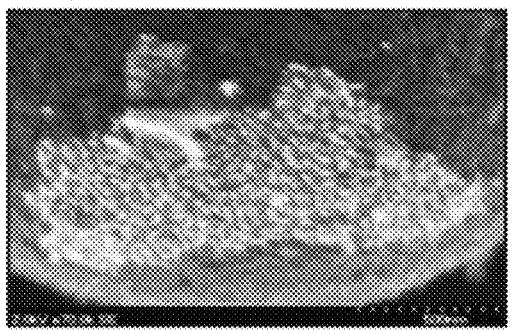
FIG. 41 is a close up view of the SEM image of the 10 wt % Pt/Templated carbon made by impregnation of previously pyrolyzed templated carbon.

According to yet another embodiment, the platinum impregnation may be performed after the carbon support is formed (i.e. pyrolyzed). This procedure eliminates any problems that could potentially arise when both impregnations are done before the conductive carbon support is formed, such as shielding of Pt during the decomposition of the carbon precursor at relatively low temperatures and coking at higher temperatures. FIGS. 40 and 41 show SEM images of the wt % Pt/Templated carbon made by impregnation of the pyrolyzed templated carbon. As shown, the platinum decorated phase forms large islands made of rather large platinum particles. In this instance, the carbon support does not lock the size of platinum particles to the nanosize scale, as in the case of materials when impregnation with platinum is done before of the pyrolysis of carbon.

Figure 42:
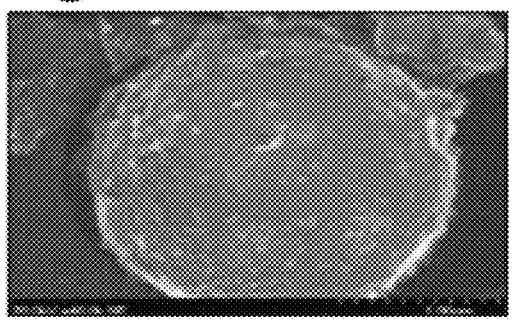
FIG. 42 is an SEM image of the GEN 2 10 wt. % Pt/Templated carbon with complete filing of the mesopores of the template prior to silica removal.
Figure 43:
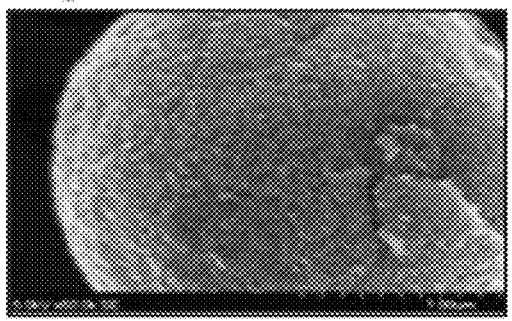
FIG. 43 is an SEM image of the GEN 2 10 wt. % Pt/Templated carbon with complete filing of the mesopores of the template after silica removal.
Figure 44:
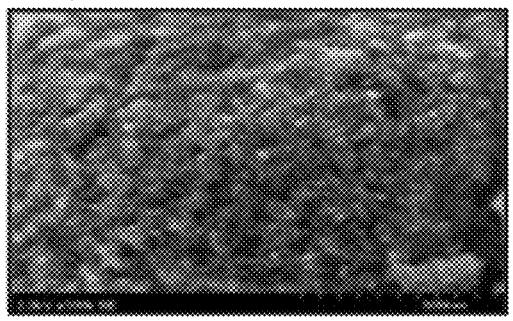
FIG. 44 is a close up of the particle shown in FIG. 43.
Figure 45:
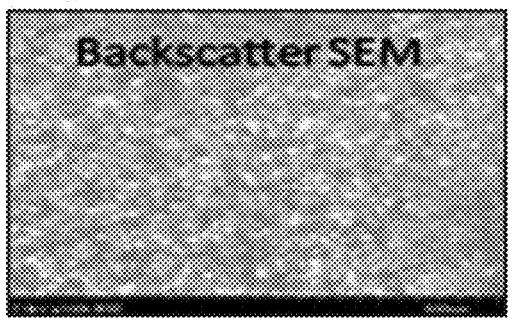
FIG. 45 is a backscatter SEM image of the particle shown in FIG. 43.
Figure 46:
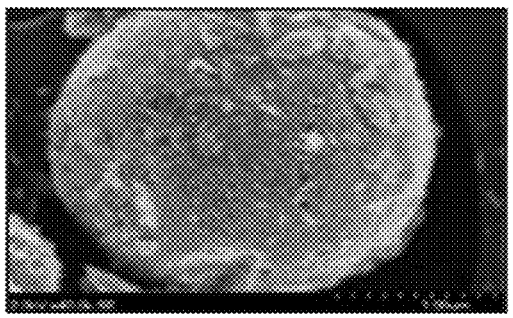
FIG. 46 is an SEM image of the GEN 2 10 wt. % Pt/Templated carbon with incomplete filing of the mesopores of the template prior to silica removal.
Figure 47:
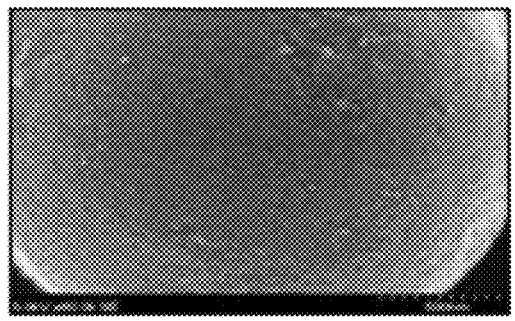
FIG. 47 is an SEM image of the GEN 2 10 wt. % Pt/Templated carbon with incomplete filing of the mesopores of the template after silica removal.
Figure 48:
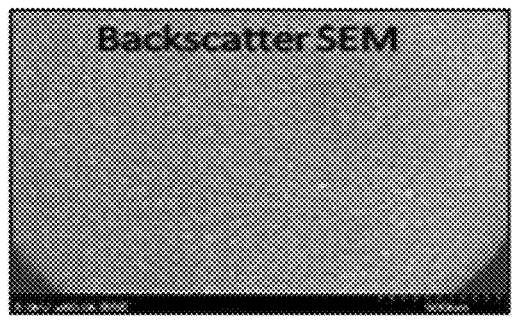
FIG. 48 is a backscatter SEM image of the particle shown in FIG. 47.

Further control of the structure of the impregnated material may be obtained by controlling the degree of infiltration of the templating materials (e.g. carbon and platinum) into the mesopores of the original (e.g. silica) bimodal microparticles. FIGS. 42-48 show 10 wt. % Pt/Templated carbon particles formed by complete (FIGS. 42-45) and incomplete (FIGS. 46-48) infiltration of the silica mesopores with the carbon/pt templating material. FIGS. 42 and 46 show the particles before silica removal and FIGS. 43 and 47 shows the particles after silica removal. The particles shown in FIGS. 46-48 include additional pores created by the incomplete filing of the silica mesopores. Both types of carbon particles showed remarkable dispersion of platinum phase. This emphasizes the essential role of the nanopores in the silica template for the synthesis of the electrocatalysts.

Figure 49:
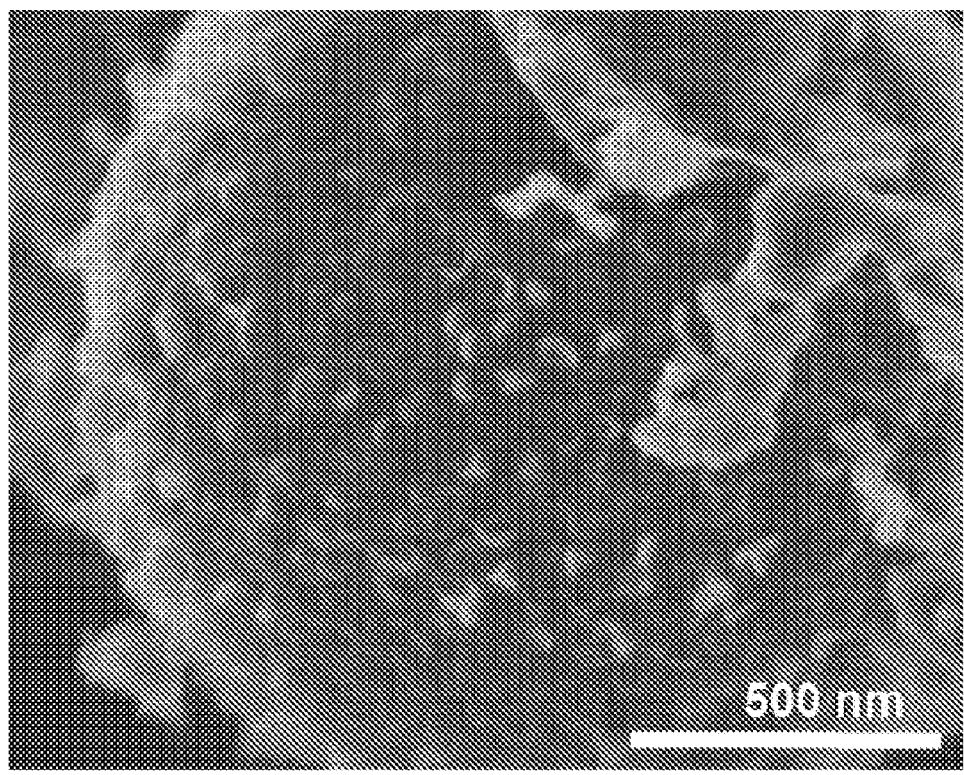
FIG. 49 is an SEM image of a microemulsion templated porous niobium oxide particle formed using the techniques disclosed herein.

The described methodology can be applied to other oxide materials, such as niobium, ruthenium and titanium, which are viewed as a promising alternative to carbon supports (See e.g., Chen, G.; Bare, S. R.; Mallouk, T. E. *J. Electrochem. Soc.* 2002, 149, A1092-A1099; Garcia, B. L.; Fuentes, R.; Weidner, J. W. *Electrochem. Solid-State Lett.* 2007, 10, B108-B110; Ioroi, T.; Senoh, H.; Yamazaki, S. I.; Siroma, Z.; Fujiwara, N.; Yasuda, K. *J. Electrochem. Soc.* 2008, 155, B321-B326; Sasaki, K.; Adzic, R. R. *J. Electrochem. Soc.* 2008, 155, B180-B186; and Sasaki, K.; Zhang, L.; Adzic, R. R. *Phys. Chem. Chem. Phys.* 2008, 10, 159-167, each of which is hereby incorporated by reference). An example for niobium oxide porous particle fabricated by the same microemulsion templating technique is shown in FIG. 49. As shown, the pores in the niobium oxide particle are arranged in a honeycomb-like fashion. The structure of this particle is analgous to the silica particles shown and described herein. The BET surface area of the niobium oxide particles is 180 $m^2/g$.

It will be appreciated that a wide variety of materials will be suitable for impregnation using the techniques and materials described herein. Exemplary materials include, but are not limited to, platinum alloys such as Pt—Ru, Pt—Rh, Pt—Ir, Pt—Co, Pt—Ni, Pt—Ni, Pt—Cu, and Pt—Au.

Some applications for the presently described bimodal particles may require, or have improved performance, when the population of particles is monodisperse. The potential applications of the particles produced by the described technology can be extended by making them monodisperse using microfluidic devices such as or similar to those described in previously incorporated U.S. patent application Ser. No. 12/263, 947. Monodisperse particles can be ordered in 2D and 3D arrays (See e.g., Prevo, B. G.; Velev, O. D. *Langmuir* 2004, 20, 2099-2107, which is hereby incorporated by reference) that offer a third level of porosity associated with the void spaces between the microspheres.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a host cell" includes a plurality (for example, a culture or population) of such host cells, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

What is claimed is:

1. A method comprising:
   providing an aqueous sol phase comprising an oxide precursor and an ionic surfactant;
   providing an oil phase comprising a non-ionic surfactant; wherein
      when adsorbed, the ionic and non-ionic surfactants are able to decrease the interfacial tension sufficiently to lead to spontaneous formation of microemulsion drops; and
      the ionic surfactant is soluble only in the sol phase and the non-ionic surfactant is soluble only in the aqueous phase; and
   producing an emulsion by combining the aqueous sol phase with the oil phase; wherein the emulsion contains larger droplets containing:
      oil microemulsion droplets; and
      ionic micelles.

2. The method of claim 1 further comprising subjecting the larger droplets to polymerization and oil and solvent removal to produce oxide microparticles having a bimodal porous network comprising nanopores and mesopores.

3. The method of claim 2 further comprising:
   providing a second precursor, wherein said second precursor is a precursor to a secondary material
   exposing the microparticles to the second precursor under suitable conditions such that the second precursor is able to at least partially infiltrate the bimodal porous network; and
   decomposing the second precursor so as to produce microparticles impregnated with the secondary material.

4. The method of claim 3 further comprising removing the oxide material such that microparticles formed from the secondary material remain substantially intact.

5. The method of claim 3 further comprising:
   providing a third precursor wherein the third precursory is a precursor to a tertiary material;
   exposing the microparticles to the third precursor under suitable conditions such that the third precursor is able to at least partially infiltrate the bimodal porous network; and
   decomposing the third precursor so as to produce microparticles impregnated with nanoparticles formed from the secondary material.

6. The method of claim 5 further comprising selecting the size of the nanoparticles formed from the secondary material by selecting the ionic surfactant.

7. The method of claim 5 wherein the second and third precursors are exposed to the microparticles simultaneously.

8. The method of claim 5 comprising:
   exposing the microparticles to the second precursor;
   heat-treating the microparticles; and then
   exposing the microparticles to the third precursor.

9. The method of claim 3 wherein the secondary material is carbon.

10. The method of claim 5 wherein the secondary material is carbon.

11. The method of claim 5 wherein the tertiary material is platinum.

* * * * *

UNITED STATES PATENT AND TRADEMARK OFFICE
CERTIFICATE OF CORRECTION

PATENT NO. : 8,334,014 B1
APPLICATION NO. : 12/484885
DATED : December 18, 2012
INVENTOR(S) : Petsev et al.

It is certified that error appears in the above-identified patent and that said Letters Patent is hereby corrected as shown below:

In the Specifications

Col. 1, lines 20-26: replace "This invention was made with Government support under Grant Nos. NSF/PREM (DMR 061161) and NSF/IGERT (DGE 0549500) awarded by National Science Foundation and DOE/NNSA-LANL Prime Contract DE-AC52 06NA25396, LANL subcontract No. 53184-001-07, awarded by the Department of Energy and Los Alamos National Labs. The U.S. Government has certain rights in this invention."

with
--This invention was made with Government support under Grant Nos. NSF/PREM (DMR 061161), NSF/IGERT (DGE 0549500) and CBET-0828900 awarded by National Science Foundation and DOE/NNSA-LANL Prime Contract DE-AC52 06NA25396, LANL subcontract No. 53184-001-07, awarded by the Department of Energy and Los Alamos National Labs. The U.S. Government has certain rights in this invention.--

Signed and Sealed this
Thirteenth Day of August, 2013

Teresa Stanek Rea
*Acting Director of the United States Patent and Trademark Office*